US012770470B2

(12) United States Patent
Daley et al.

(10) Patent No.: US 12,770,470 B2
(45) Date of Patent: Oct. 20, 2026

(54) SYSTEMS AND METHODS FOR PROVIDING AN ELECTRONIC CARD GAME WITH INCREASING FREE GAMES MULTIPLIERS

(71) Applicant: Aristocrat Technologies, Inc., Las Vegas, NV (US)

(72) Inventors: John Daley, Las Vegas, NV (US); Christopher Brune, Carson City, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 530 days.

(21) Appl. No.: 18/300,225

(22) Filed: Apr. 13, 2023

(65) Prior Publication Data

US 2024/0346887 A1 Oct. 17, 2024

(51) Int. Cl.
*G07F 17/32* (2006.01)

(52) U.S. Cl.
CPC ...... *G07F 17/3267* (2013.01); *G07F 17/3293* (2013.01)

(58) Field of Classification Search
CPC .... G07F 17/3267; G07F 17/3293; A63F 1/00; A63F 1/04; A63F 2001/005
See application file for complete search history.

(56) References Cited

U.S. PATENT DOCUMENTS 6,612,927 B1 * 9/2003 Slomiany ............ G07F 17/3267 463/16
8,167,711 B2 * 5/2012 Baerlocher ......... G07F 17/3258 463/16
8,277,305 B2 * 10/2012 Caputo ............... G07F 17/3267 463/16
10,930,117 B2 2/2021 Moody
2002/0082069 A1 * 6/2002 Parker ................. A63F 3/00157 463/13
2002/0198044 A1 * 12/2002 Walker .................... G07F 17/32 463/25
2003/0054872 A1 * 3/2003 Locke ..................... G07F 17/32 463/20
2004/0087359 A1 * 5/2004 Cuddy .................... G07F 17/32 463/20
2005/0054423 A1 3/2005 Wadleigh
2005/0070354 A1 * 3/2005 Baerlocher ......... G07F 17/3267 463/20
2006/0073876 A1 * 4/2006 Cuddy ............... G07F 17/3244 463/20

(Continued)

*Primary Examiner* — Milap Shah
(74) *Attorney, Agent, or Firm* — Armstrong Teasdale LLP

(57) ABSTRACT

An electronic gaming system includes a memory, a display device, and a processor configured to execute instructions stored in the memory, which when executed, cause the processor to: generate a base game that includes display of a hand of cards; determine that the hand of cards includes a winning card combination that triggers a free games feature; generate a first free game of the free games feature that includes display of a first free hand of cards, wherein a first multiplier is applied to an award associated with the first free game; and after the first free game, generate a second free game of the free games feature that includes display of a second free hand of cards, wherein a second multiplier is applied to an award associated with the second free game, the second multiplier being greater than the first multiplier.

18 Claims, 13 Drawing Sheets

(56) References Cited

U.S. PATENT DOCUMENTS

2006/0211468 A1 9/2006 Flint
2006/0258425 A1 11/2006 Edidin
2007/0232378 A1 10/2007 Gomez
2007/0249419 A1* 10/2007 Tarantino ............ G07F 17/3267 463/25
2008/0096655 A1 4/2008 Rasmussen
2009/0124326 A1* 5/2009 Caputo .................. G07F 17/34 463/20
2009/0131148 A1 5/2009 Loose
2009/0176551 A1* 7/2009 Wilson ................ G07F 17/3267 463/20
2012/0088567 A1 4/2012 Aoki
2012/0196666 A1* 8/2012 Moody ............... G07F 17/3216 463/13
2012/0214580 A1* 8/2012 Hoffman ............ G07F 17/3225 463/42
2013/0244777 A1 9/2013 Barclay
2014/0113703 A1* 4/2014 Bigelow, Jr. ........ G07F 17/3244 463/20
2014/0329591 A1* 11/2014 Caputo ............... G07F 17/3258 463/29
2015/0221181 A1 8/2015 Allen, II
2015/0287286 A1* 10/2015 Beria .................. G07F 17/3262 463/20
2015/0364008 A1* 12/2015 Shoenhair ............ G07F 17/326 463/43
2016/0300453 A1 10/2016 Slomiany
2016/0321875 A1 11/2016 Tessmer
2017/0124799 A1* 5/2017 Berman .............. G07F 17/3213
2018/0322723 A1 11/2018 Lemay
2019/0026989 A1 1/2019 Humphrey
2019/0259246 A1 8/2019 Mark
2019/0318579 A1* 10/2019 Marsh ................. G07F 17/3213
2020/0051381 A1* 2/2020 Tam .................... G07F 17/3225
2020/0066101 A1* 2/2020 Selegue ................. G06Q 50/34
2020/0098227 A1* 3/2020 Hendricks ............... G07F 17/34
2021/0027583 A1* 1/2021 Cuddy ................ G07F 17/3267
2021/0225129 A1 7/2021 Pop
2023/0012500 A1* 1/2023 Moody ............... G07F 17/3258
2024/0321055 A1* 9/2024 Schaefer ............. G07F 17/3213

* cited by examiner

| HAND | 1CR | 2CR | 3CR | 4CR | 5CR |
|---|---|---|---|---|---|
| ROYAL FLUSH | 250 | 500 | 750 | 1000 | 4000 |
| FOUR ACES | 160 | 320 | 480 | 640 | 800 |
| FOUR 2s, 3s, 4s | 80 | 160 | 240 | 320 | 400 |
| FOUR 5s thru Ks | 50 | 100 | 150 | 200 | 250 |
| THREE OF A KIND | 3 | 6 | 9 | 12 | 15 |
| TWO PAIR | 1 | 2 | 3 | 4 | 5 |
| STRAIGHT | 4 | 8 | 12 | 16 | 20 |

SYSTEMS AND METHODS FOR PROVIDING AN ELECTRONIC CARD GAME WITH INCREASING FREE GAMES MULTIPLIERS

TECHNICAL FIELD

The field of disclosure relates generally to electronic gaming, and more specifically, to systems and methods for electronic card games that include enhanced award multipliers for a free games feature.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system includes a memory, a display device, and a processor configured to execute instructions stored in the memory. The instructions, when executed, cause the processor to: generate a base game that includes display of at least one hand of cards on the display device; determine that the at least one hand of cards includes at least one winning card combination that satisfies a first condition to trigger a free games feature: in response to the first condition being satisfied, generate a first free game of the free games feature that includes display of a first free hand of cards, wherein a first multiplier is applied to an award associated with the first free game; and in response to the first condition being satisfied and after the first free game, generate a second free game of the free games feature that includes display of a second free hand of cards, wherein a second multiplier is applied to an award associated with the second free game, the second multiplier being greater than the first multiplier.

In another aspect, a non-transitory computer-readable medium contains instructions embodied thereon, which when executed by a processor, cause the processor to: generate, on a display device in communication with the processor, a base game that includes display of at least one hand of cards; determine that the at least one hand of cards includes at least one winning card combination that satisfies a first condition to trigger a free games feature: in response to the first condition being satisfied, generate a first free game of the free games feature that includes display of a first free hand of cards, wherein a first multiplier is applied to an award associated with the first free game; and in response to the first condition being satisfied and after the first free game, generate a second free game of the free games feature that includes display of a second free hand of cards, wherein a second multiplier is applied to an award associated with the second free game, the second multiplier being greater than the first multiplier.

In another aspect, a computer-implemented method of providing a game on an electronic gaming system includes: generating a base game that includes display of at least one hand of cards on a display device of the electronic gaming system: determining that the at least one hand of cards includes at least one winning card combination that satisfies a first condition to trigger a free games feature; in response to the first condition being satisfied, generating a first free game of the free games feature that includes display of a first free hand of cards, wherein a first multiplier is applied to an award associated with the first free game; and in response to the first condition being satisfied and after the first free game, generating a second free game of the free games feature that includes display of a second free hand of cards, wherein a second multiplier is applied to an award associated with the second free game, the second multiplier being greater than the first multiplier.

BRIEF DESCRIPTION OF THE DRAWINGS

Corresponding reference numbers shown in the drawings indicate corresponding elements and features.

DETAILED DESCRIPTION

Figure 1:
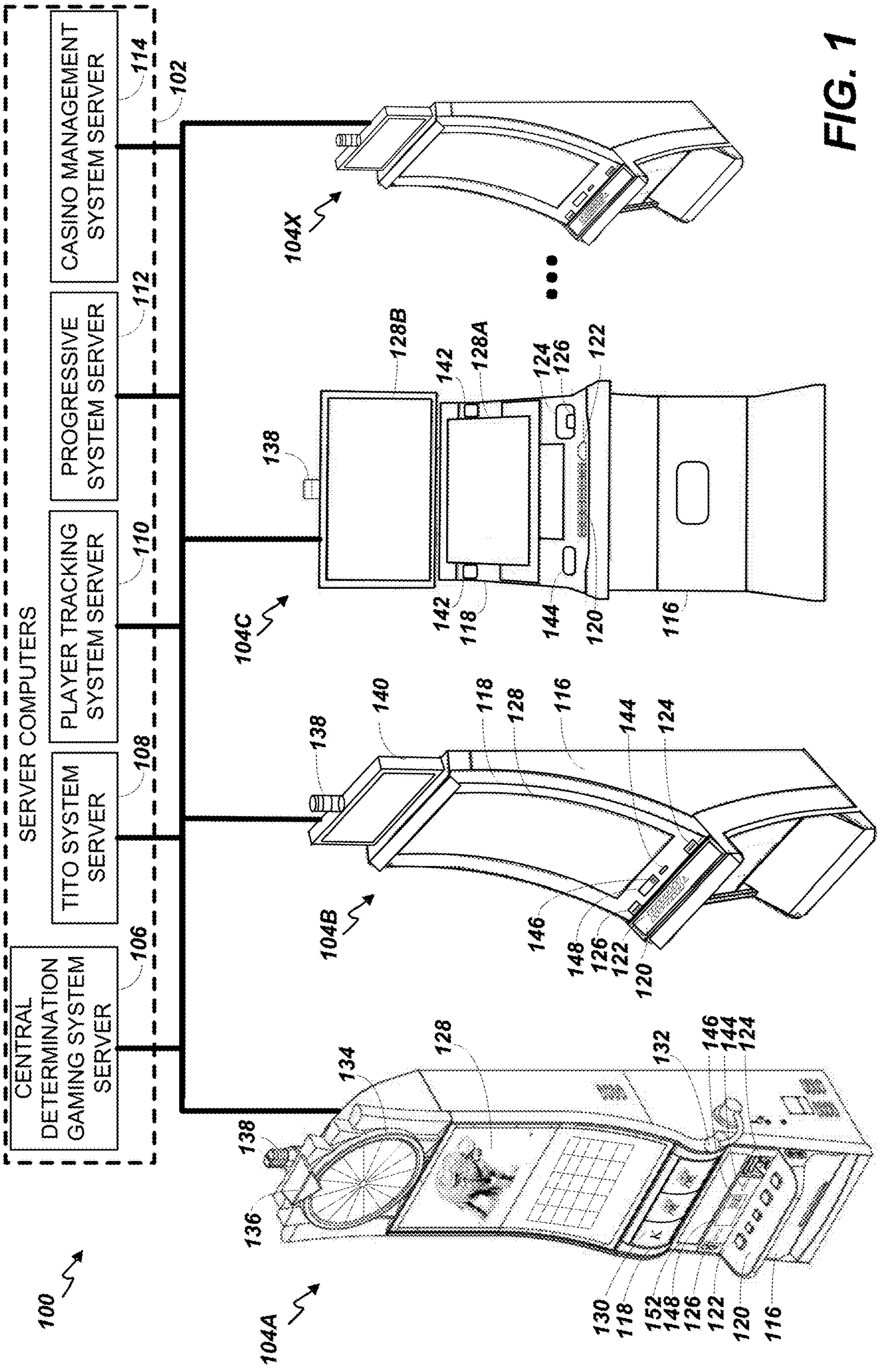
FIG. 1 is an exemplary diagram showing several EGMs networked with various gaming related servers.

In conventional video poker games, during base gameplay, a gaming device may display an initial base hand of cards (also referred to as an initial deal of the base hand of cards) randomly selected from a virtual deck of cards. In certain video poker games, the player may be enabled to select cards from the base hand of cards to either be held or discarded. Any cards that are selected to be discarded are removed from the base hand of cards. The cards remaining in the base hand of cards, if any, are the cards the player selected to be held. Gameplay continues with randomly selecting additional cards from the virtual deck of cards to complete the base hand of cards (i.e., to replace the discarded cards). In multi-hand type video poker games, one or more additional hands of cards may also be displayed. The additional hands of cards are initially populated with the held cards from the base hand of cards, if any. The additional hands of cards are then completed with cards randomly selected from respective additional virtual card decks. Awards for winning card combinations in any of the completed base hand of cards and the completed additional hands of cards may then be disbursed to the player. Some video poker games may also include additional features such as multipliers on the awards for winning card combinations in the completed base hand of cards and/or the completed additional hands of cards, and free hands of cards. The additional features may be triggered based on predefined card combinations in either the initial base hand of cards, the completed base hand of cards, and/or the completed additional hands of cards. However, the additional features provided by video poker games remain limited and the player may perceive a lack of variety and/or excitement during gameplay. A need exists for video poker games that facilitate providing enhanced entertainment value, increasing the variability and flexibility provided during video poker game play, and maintaining or reducing the computational resources used while doing so.

Described herein is an electronic gaming system that presents technical improvements in operation, capability, and user interface ("UI") features of electronic gaming devices, as well as improvements in features of backend processing to implement the operation, capability, and UI features. The gaming system implements a winning card combination-driven mechanic in an RNG-based electronic card game environment that triggers a free games feature including multiple free card games. A multiplier is applied to each free card game of the free games feature. The applied multiplier increases with each successive free card game to facilitate increasing variety of the free games feature and enhance the entertainment value of the game. Moreover, a number of free games and/or a multiplier applied during one or more free card games may vary based on the particular winning card combination that triggers the free games feature, to further facilitate increasing the variety of the free games feature and player excitement and engagement. The gaming system implements various tools that facilitate control over increased randomness and payout volatility associated with the enhanced variety of the free games feature, such as, for example, a second condition required to trigger the free games feature and/or utilizing a random selection of multipliers applied during one or more of the free games. The technical improvements provided by the gaming system may be implemented, for example, in a video poker game played on a gaming device, but are not limited to video poker games and may be implemented in any suitable electronic card game. Moreover, the technical improvements may be implemented by any suitable gaming device.

The technical improvements provided herein include, inter alia, increasing the flexibility in providing a free games feature in an electronic card game and varying (e.g., increasing) the payout awards associated with the free games feature. This may be achieved by initiating the free games feature in response to various pre-defined winning card combinations displayed during a base electronic card game, applying successively increasing multipliers to free game payout awards associated with the free games feature, and varying a set of free games associated with the various pre-defined winning card combinations.

Certain technical problems are associated with increasing the flexibility in providing the free games feature and varying the payout awards of the free games feature. For example, triggering the free games feature based on various pre-defined winning card combinations displayed during the base electronic card game increases the degree of randomness associated with the free games feature being triggered, and may cause larger payouts to be awarded by increasing the free games feature trigger rate. Moreover, successively increasing multipliers applied during free card games played during the free games feature creates the additional opportunity to increase payout volatility. Thus, a gaming machine implementing the subject matter described herein must include proper control functions to comply with gaming regulations, such as achieving a designated game return to player ("RTP"), and managing volatility of payouts. These technical problems are unique to gaming technology that implements the technical improvements described herein, and are not presented in conventional gaming devices that do not offer the flexibility in triggering a free games features and variety in the free games played during the free games feature as provided herein. As conventional gaming devices have not faced the technical problems presented by the gaming technology described herein, no technical solution to these technical problems exists.

In view thereof, in order to solve the technical problems presented by the technical improvements described herein, the gaming system described herein provides various tools for managing volatility and RTP in a computationally-effective way, while also enabling improved usability and enhanced user experience. For example, the gaming system described herein facilitates controlling and/or managing the degree of randomness that is otherwise increased by triggering a free games feature based on various pre-defined winning card combinations displayed during a base electronic card game and successively increasing multipliers applied during free card games of the free games feature. In example implementations, the pre-defined winning card combinations may need to be displayed in an initially dealt hand of cards randomly selected from a virtual deck of cards. The probability that the free games feature will be triggered based on a pre-defined winning card combination may be selectively adjusted using lookup tables that are weighted to control the rate at which the pre-defined winning card combinations appear in the initial deal. Additionally and/or alternatively, the set of free games associated with the pre-defined winning card combinations may vary in either or both a number of free games played and multipliers applied during one or more of the free games, and pre-defined winning card combinations associated with a lower number of free games or lower multipliers may have a greater probability of being displayed during the base electronic card game to trigger the free games feature. Additionally and/or alternatively, satisfying a second condition may be required to make the player eligible to trigger the free games feature based on various pre-defined winning card combinations displayed during the base electronic card game. For example, the second condition may be satisfied by an additional wager amount received from the player before play of the base electronic card game. Additionally and/or alternatively, the multipliers applied during free card games of the free games feature may be randomly selected using lookup tables that are weighted to control the overall distribution of the multipliers applied during the free games feature.

In view thereof, the gaming systems and methods described herein facilitate improving gaming device operation, capability, and user interface features at least by implementing the following features: i) generating a base game that includes display of at least one hand of cards on the display device: ii) determining that the at least one hand of cards includes at least one winning card combination that satisfies a first condition to trigger a free games feature: iii) in response to the first condition being satisfied, generating a first free game of the free games feature that includes display of a first free hand of cards, wherein a first multiplier is applied to an award associated with the first free game; and/or iv) in response to the first condition being satisfied and after the first free game, generate a second free game of the free games feature that includes display of a second free hand of cards, wherein a second multiplier is applied to an award associated with the second free game, the second multiplier being greater than the first multiplier.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
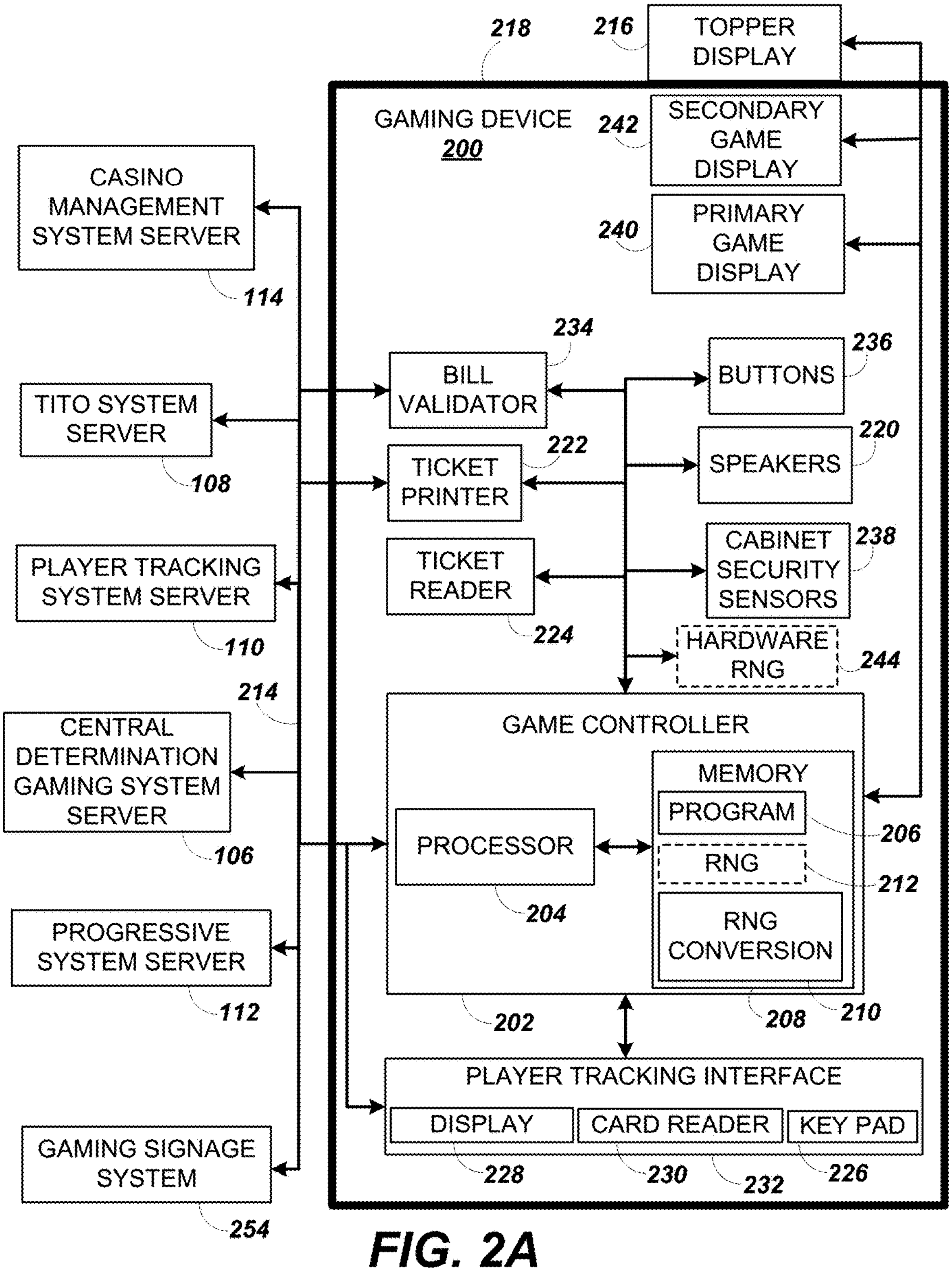
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204: (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term “game instance” refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a “random number”).

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games: newly introduced game elements such as extra reels, new symbols, or new cards: stop positions for dynamic game elements such as spinning reels, spinning wheels, or shifting reels: or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
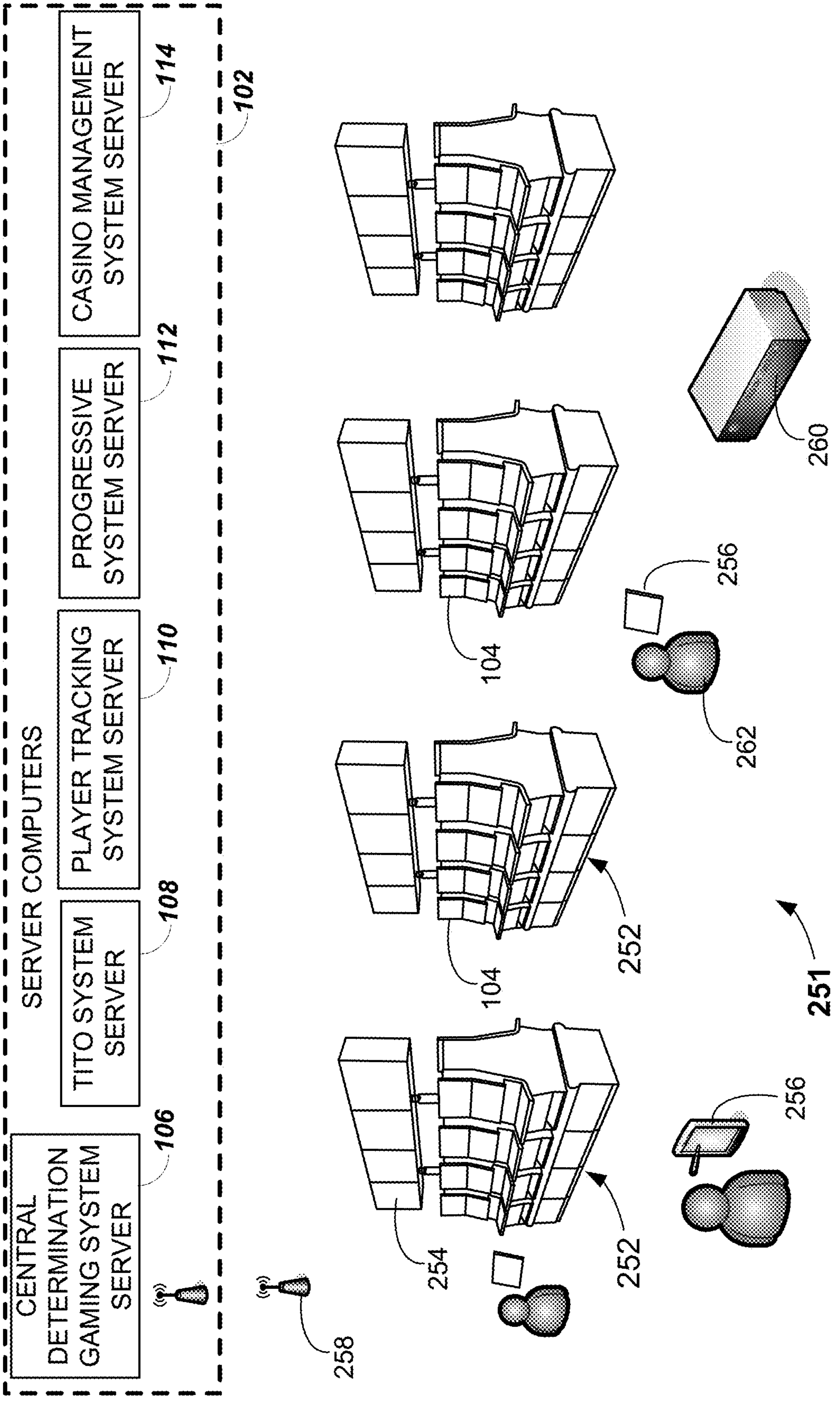
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
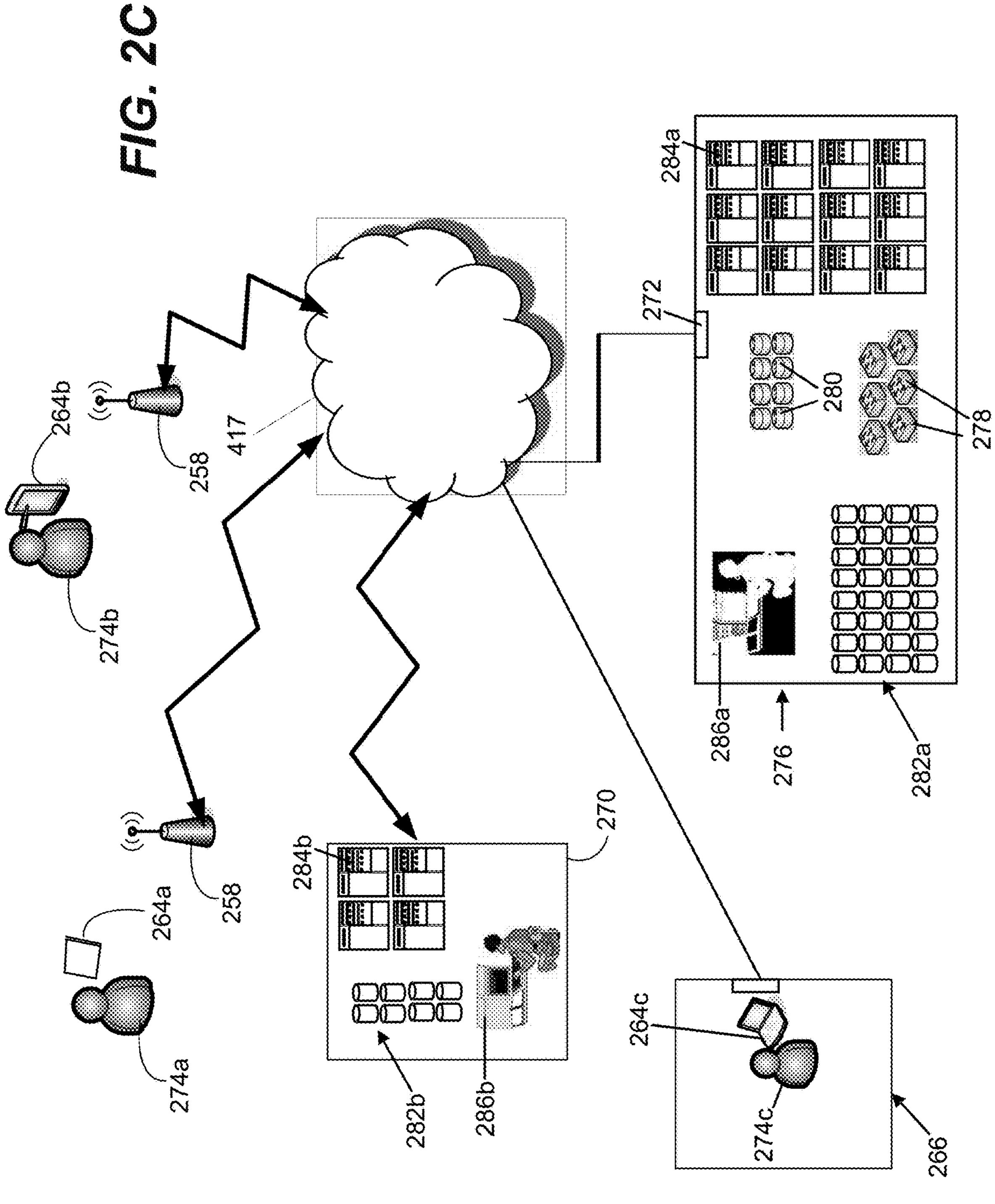
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
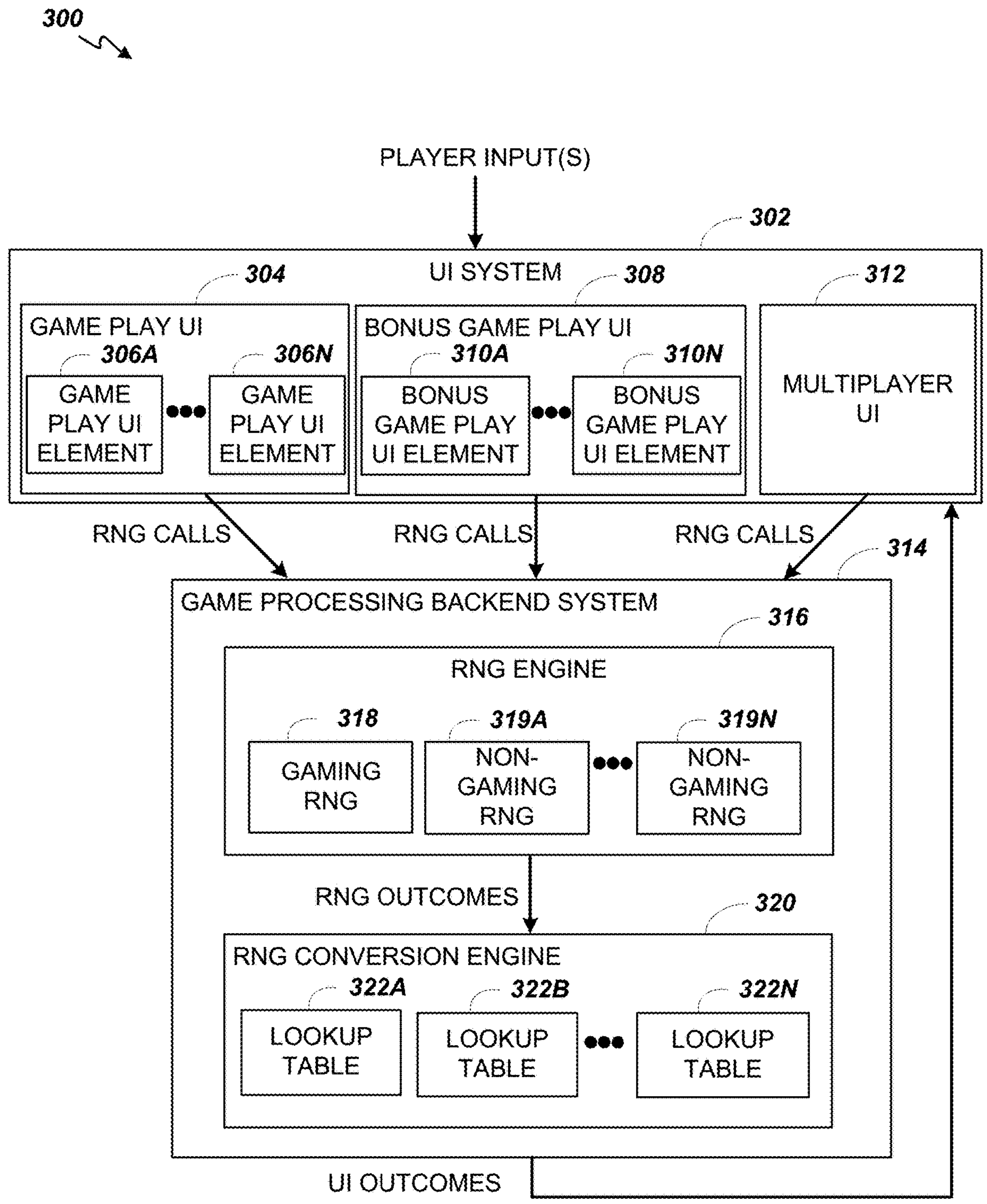
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Example Electronic Card Games, Free Games Features, and Increasing Multipliers for the Free Games Features Electronic gaming systems and methods described herein may provide various types of electronic card games (e.g., video poker games). Example embodiments are described herein with respect to a video poker game but may be applicable to other types of electronic card games. One common example of a video poker game is Five Card Draw poker, in which a hand of five cards are displayed or dealt face-up to a player, the hand of five cards having been randomly selected from a virtual fifty-two card deck of playing cards. The player may selectively discard none, one, multiple, or all of the five cards. Each discarded card is replaced with another card from the virtual deck to complete the hand of five cards. After the replacement (if any), the cards are evaluated for one or more winning card combinations. For a five-card poker game, there are typically ten general categories of hands, ranked from highest to lowest (also referred to as "ranks"), as shown in Table 1 below.

TABLE 1

Ranking of Five Card Draw Poker Hands

| Rank | Name |
|---|---|
| 1 | Royal Straight Flush |
| 2 | Straight Flush |
| 3 | Four of a Kind |
| 4 | Full House |
| 5 | Flush |
| 6 | Straight |
| 7 | Three of a Kind |
| 8 | Two Pair |
| 9 | One Pair |
| 10 | High Card |

Within each category, hands are ranked according to the rank of individual cards, with an Ace being the highest card and a Two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of Straight Flush, Four of a Kind, or Flush. There are over a hundred equivalent hands for each Two Pair variation, and there are over 1,000 equivalent hands for each type of no-pair hand.

Some variations of Five Card Draw poker enable a player to play multiple hands (also referred to as "multi-hand variations"). In these multi-hand variations, the player plays the dealt hand of cards (also referred to as a "base hand of cards") and one or more additional hands of cards. The additional hands of cards are not dealt but rather are initially populated with the held cards from the base hand of cards, i.e., the cards that are not selectively discarded from the base hand of cards, if any. The additional hands of cards are then completed with cards randomly selected from respective additional virtual fifty-two card deck of playing cards. After the base hand of cards and each additional hand of cards are completed, the cards are evaluated for one or more winning card combinations based on the ranks described above.

Numerous variations of video poker games exist in addition to Five Card Draw poker. Other example video poker games include, but are not limited to, Three Card Poker, Five Card Stud, Seven Card Stud, Hold 'Em (also called Texas Hold 'Em), Omaha (also called Omaha Hold 'Em), and Pai-Gow Poker. These games may differ, for example, the manner in which cards are initially dealt and the manner and frequency in which bets are placed. Various criteria may also be used to determine the winning hand, including the highest ranking hand, the lowest ranking hand (Low-Ball), and where the highest ranking and lowest ranking hands each win half of the pot (High-Low).

In certain known multiplayer variations of video poker, players play against each other rather than against a dealer or house. In certain of these variations, a round of play begins when each player has placed an initial bet, which is typically referred to as the ante, into the pot. The term "pot" typically refers to the total accumulation of antes and wagers made during a particular game. In some video poker variations, such as Texas Hold 'Em, only two players of the poker game make the initial bets (also referred to as "blinds").

The number of cards included in a dealt hand of cards depends on the particular variation of video poker being played. For example, in Five Card Draw poker, a player (or each player in multi-player variations) is initially dealt five cards. In Three Card Poker games where the player plays against a dealer hand, the player is dealt a total of three cards and the dealer hand includes a total of three cards as well. In some Three Card Poker games, the initially dealt player hand and dealer hand are final and there is no option to replace or draw any new cards. In Texas Hold 'Em, Five Card Stud and Seven Card Stud, each player is initially dealt two cards. These cards are typically dealt face-down. However, depending on the game, some of the cards may be dealt face-up to the player. For example, in certain versions of Five Card Stud, each player is initially dealt one card face-up and one card face-down. In Texas Hold 'Em, each player is initially dealt two cards face-down (also referred to as the "hole cards").

For certain video poker variations in which additional cards are dealt or in which cards may be replaced, after the initial deal, a first round of wagering begins, in which the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by at least one remaining player such that each remaining player has wagered the same amount into the pot during the round.

Depending on the variation of video poker being played, each game may have only an initial wager or several rounds of wagering, where each round of wagering is generally preceded by the dealing of one or more cards. A player wins a game of poker by being the last remaining player in the game after all other players have folded or by having the highest ranking hand when a showdown occurs. If two or more players remain after the final round of wagering is complete, a showdown occurs. During the showdown, each remaining player's hand is displayed, the highest ranking hand is determined to be the winning hand, and the pot is provided to the player having the winning hand. If two or more players have identically ranked hands that are the highest ranking hands, the pot is split evenly among the tying players.

Texas Hold 'Em is one example of a multi-player electronic card game that may be played via a computer-based virtual card table. In one version of Texas Hold 'Em, only two players at a table make the initial bets, commonly referred to as the blinds. The blinds include a big blind and a small blind. The big blind is typically twice the value of the small blind. In a blind-based game such as Texas Hold 'Em, all players are initially eligible to receive a hand, even if they do not place the big blind or the small blind. After the players have placed an initial wager or "anted" (if an ante is required), each player eligible for play is dealt an initial set of cards. Each of the players must match the blinds, raise the blinds or fold. Texas Hold 'Em includes a designated quantity of community cards (usually five) that can be used by all of the players in combination with their hole cards. In some variations, there may only be three community cards. In some Texas Hold 'Em games, the community cards are dealt over the course of several wagering rounds. For example, the gaming device or dealer deals the flop (usually three cards), the turn (usually one card), and the river (usually one card). The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold 'Em. In other variations of Texas Hold 'Em, where the quantity of community cards is only three, the flop is a single card rather than three cards.

Figure 4:
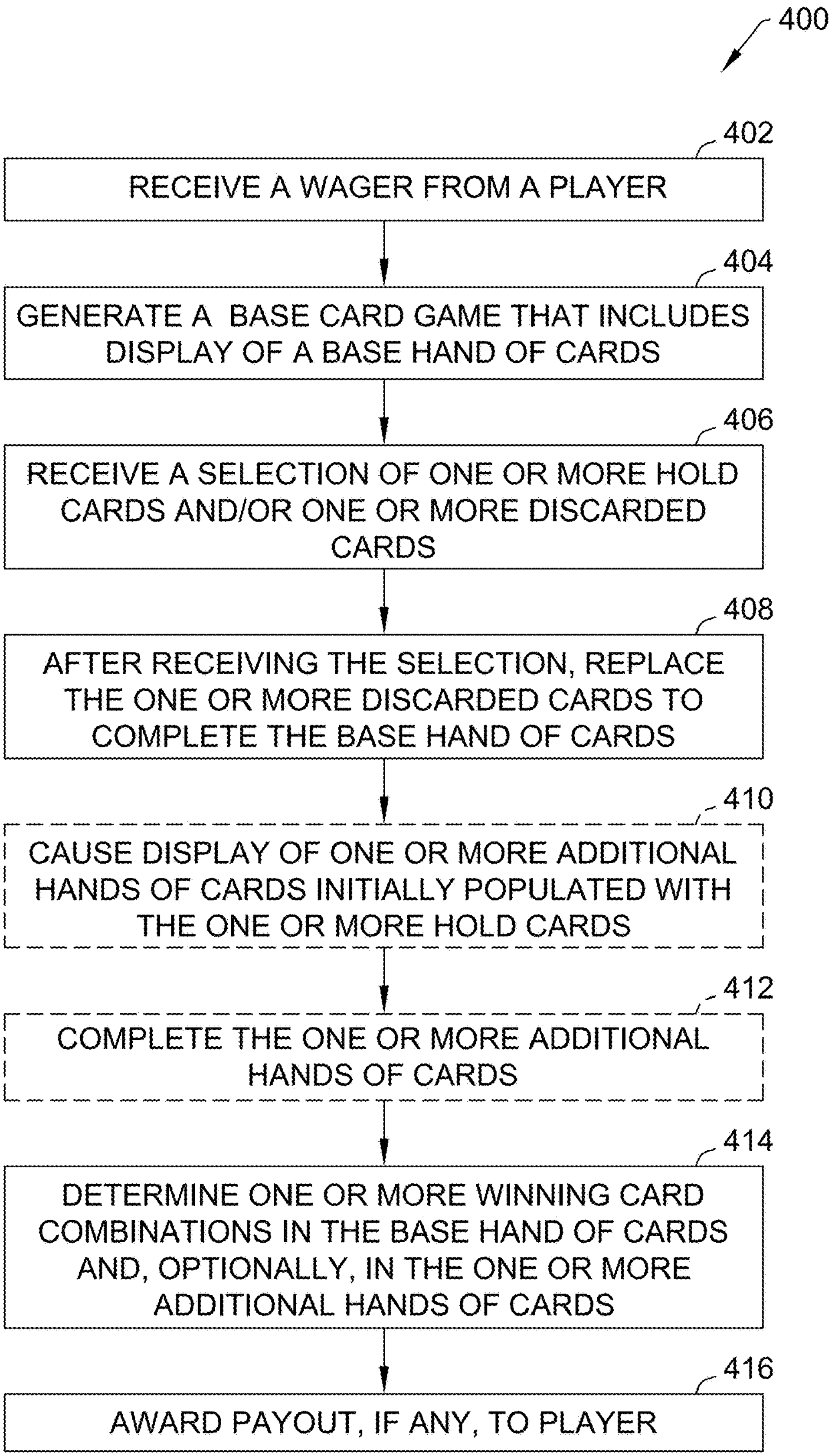
FIG. 4 illustrates an example computer-implemented method of providing a base electronic card game.

Referring now to FIG. 4, an example method 400 of providing a base electronic card game (e.g., a video poker game) is illustrated. In the example embodiment, the electronic card game is a multi-hand variation of Five Card Draw poker. In other examples, the method 400 may provide any suitable base electronic card game, such as any video poker game including, without limitation, the video poker games described above and any variation thereof. The example method 400 may be implemented in a server (e.g., server 102) and/or a gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 can store one or more game programs 206 that provide program instructions and/or data for carrying out various implementations (e.g., game mechanics) that, when executed by the processor 204, cause the processor 204 to perform certain operations to perform the method 400.

The method 400 includes, initially, receiving 402 a wager from a player of the electronic card game. The wager may be received 402 from the player at the gaming device (e.g., using player-input buttons or a touch screen display) where the player selects and/or enters an amount of the wager (e.g., a number of credits) to bet for a play of the electronic card game. The amount of the wager received 402 from the player may satisfy a base bet that makes the player eligible for a play of the electronic card game. The player may be enabled to place different wager amounts to be eligible for a play of the electronic card game. A wager amount may determine the prizes that the player is eligible to be awarded for one or more winning card combinations during gameplay. For example, a wager amount that satisfies the base bet may range from between one credit and five credits, where a wager amount of five credits makes the player eligible for the highest possible payout for each winning card combination and a wager amount of one credit makes the player eligible for the lowest possible payout for each winning card combination. In some examples, the method 400 may including receiving 402, as part of and/or in addition to the wager, an additional wager (e.g., an ante bet) that makes the player eligible for enhanced prizes and/or additional features (e.g., a free games feature) during gameplay. The ante bet may be a fixed credit amount or may be a percentage (e.g., 50%, 75%, or 100%) of the wager amount that satisfies the base bet. The selected wager amount and, optionally, the amount of the ante bet, received 402 from the player may then be deducted from an established credit balance of the player, i.e., the player's credit balance is decreased by the amount of the wager. The credit balance may be established based on cash or electronic payment deposits that the player may make to fund the credits in the machine (e.g., by inserting cash or a ticket voucher through a coin acceptor or a bill validator of the gaming device, as described herein). The wager and, optionally, the ante bet may be received 402 upon being submitted by the player, which submission may be confirmed by the player using a one or more input devices (e.g., using player-input buttons or a touch screen display). For example, the player may initially select and/or enter a wager amount and, optionally, an ante bet amount and then submit the selected/entered amount to be received 402 using, for example, a confirmation button included at the gaming device (e.g., using player-input DEAL/DRAW buttons on the gaming device and/or on a touch screen display).

In response to the wager received 402 from the player, the method 400 includes generating 404 a base electronic card game that includes display of at least one hand of cards on the gaming device (e.g., on a primary game display 240 and/or a secondary game display 242 of the gaming device 200 shown in FIG. 2). In the example Five Card Draw poker game provided by the method 400, the generated 404 base game includes display of a base hand of five cards. The base hand of cards represents the initially dealt hand of cards of the generated 404 base game. The base hand of five cards is randomly selected from a virtual deck of cards. The virtual deck of cards may be a standard 52-card deck. In some variations and/or alternative poker game types, other types of card decks may be used (e.g., decks that include the standard 52 cards and one or more wild cards). In the example Five Card Draw poker game, the generated 404 base game includes display of the base hand of five cards face-up (i.e., each card of the base hand is visible to the player on the display). In some variations and/or alternative poker game types, one or more cards of the base hand of cards displayed in the generated 404 base game may be face-down (i.e., not visible to the player on the display).

The method 400 continues with receiving 406 a selection from the player indicating the cards included in the base hand of five cards that the player wishes to hold and/or the cards included in the base hand of five cards that the player wishes to discard. The hold cards are the cards that the player wishes to keep in the base hand of cards and continue to play the game with. The discarded cards are the cards that the player wishes to be eliminated from the game. The selection may be received 406 from the player at the gaming device, for example, by the player using a touch screen display of the gaming device and/or one or more player-input buttons. In some examples, the selection is received 406 from the player indicating the hold cards and any cards not selected are discarded. In some examples, the selection received 406 from the player may include none, one, multiple, or all the cards included in the base hand of five cards displayed when the base game is generated 404. The player may be enabled to select and de-select the cards the player wishes to hold or discard before the selection is received 406. Once the player is satisfied with the cards selected to be held and the cards selected to be discarded, the player may submit the selection to be received 402 using, for example, a confirmation button included at the gaming device (e.g., using player-input DRAW|DEAL buttons on the gaming device and/or on a touch screen display).

After the selection is received 406, the hold cards are kept in the base hand of cards and the discarded cards are removed from the base hand of cards. The discarded cards are then replaced 408 with one or more cards randomly selected from the virtual deck of cards to complete the base hand of five cards. For example, if the received 406 selection includes three held cards and two discarded cards, the two discarded cards are replaced 408 to complete the base hand of five cards. Similarly, a received 406 selection that includes three discarded cards would be followed by the three discarded cards being replaced 408, and a received 406 selection that includes five discarded cards would be followed by the five discarded cards being replaced 408. The one or more cards that are randomly selected from the virtual deck of cards to replace 408 the one or more discarded cards are suitably randomly selected from the virtual deck of cards that is less the five cards included in the base hand of five cards displayed when the base game is initially generated 404. In other words, the discarded cards are not put back into the virtual deck after being discarded, and the virtual deck of cards is only replenished with the discarded cards during a subsequent play of the poker game.

In some examples, the method 400 may be implemented to provide a base multi-hand poker game. In these examples, the method 400 may include causing display 410 of one or more additional hands of cards during the generated 404 base game. In the example method 400, each of the additional hands of cards includes the same number of cards as the base hand of cards. Thus, in this example, each of the additional hands of cards may include five cards. In other examples, the additional hands of cards may include more or fewer cards than the base hand of cards. The number of additional hands may be selected by the player or may be pre-defined by the base game. In some examples, the wager amount received 402 from the player may need to satisfy a base bet for each hand of cards (i.e., the base hand of cards and each additional hand of cards). For example, if a player selects to play a multi-hand variation of the poker game that includes the base hand of cards and four additional hands of cards, the wager amount received 402 may need to satisfy a base bet for all five hands of cards to be played in order for the player to be eligible to play the game. The wager amount needed to satisfy the base bet for all hands of cards may be linearly increased for each additional hand of cards (i.e., the base bet doubles for one additional hand of cards, the base bet triples for two additional hands of cards, quadruples for three additional hands of cards, and so on). Moreover, the ante bet to make the player eligible for base game enhancements and/or additional features (e.g., free games features) may be required for each additional hand of cards, or only a single ante bet may be required.

In the example method 400, the additional hands of cards are not populated (or dealt) when the base game is initially generated 404. Rather, each of the additional hands of cards are initially populated with the one or more hold cards included in the selection received 406 after the base game is generated 404 and the base hand of cards is displayed. Thus, the selection received 406 from the player indicates the cards to be held in the base hand of cards and the cards that will initially populate each of the additional hands of cards. For example, if the selection received 406 from the player includes two hold cards, each of the additional hands of cards are initially populated with the two hold cards. Similarly, if the selection received 406 from the player includes three hold cards, each of the additional hands of cards are initially populated with the three hold cards.

Subsequently, once the one or more additional hands of cards are initially populated with the one or more hold cards, the method includes completing 412 each of the additional hands of cards. In the example method, each additional hand of cards is completed 412 by randomly selecting one or more cards from a respective virtual deck of cards. The virtual deck of cards associated with each additional hand of cards is suitably a virtual deck of cards separate from the virtual decks of cards respectively associated with the base hand of cards and the remaining additional hands of cards. Thus, in examples where the base game includes the base hand of cards and four additional hands of cards, five total virtual card decks are implemented. Similarly, where the base game includes the base hand of cards and two additional hands of cards, three total virtual card decks are implemented, and where the base game includes the base hand of cards and six additional hands of cards, seven total virtual card decks are implemented. Like the virtual card deck associated with the base hand of cards, the virtual card decks respectively associated with the additional hands of cards may independently be a standard 52-card deck or other types of card decks may be used (e.g., decks that include the standard 52 cards and one or more wild cards). The virtual card decks respectively associated with the additional hands of cards may be less the hold cards initially populated into the additional hands of cards such that the one or more cards randomly selected from each respective virtual card deck to complete the additional hands of cards are not duplicates of any of the hold cards. The number of the one or more cards randomly selected from the respective virtual card deck to complete 412 the one or more additional hands of cards is determined based on the number of hold cards included in the selection received 406 from the player and the total number of cards included in the additional hands of cards. In the example method 400, the additional hands of cards each include five cards. Thus, the number of the one or more cards randomly selected from the respective virtual card deck to complete 412 the one or more additional hands of cards is five less the number of hold cards included in the selection received 406 from the player (e.g., four in the case of one hold card, three in the case of two hold cards, two in the case of three holds cards, etc.).

A backend system may be implemented to facilitate randomly selecting the cards from their respective virtual card decks to be included in the base hand of cards (both when the base game is generated 404 and the base hand of cards is subsequently completed by replacing 408 any discarded cards) and the additional hands of cards when completed 412. For example, for each random card selection and/or for each group of randomly dealt cards, the backend system may use a RNG to generate a random number and maps the random number to an outcome (i.e., a randomly selected card and/or a randomly selected group of cards) using a lookup table. FIG. 3 shows examples of lookup tables 322A . . . 322N, which are also called weighted tables. In general, a lookup table can be implemented as any data structure that assigns probabilities to different options, in order for one of the different options to be selected using a random number. Different options are represented in different entries of a lookup table. The probabilities for different options can be reflected in threshold values (e.g., 0<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, sub-ranges within the range for a random number. In some example implementations, the threshold values for a lookup table are represented as count values (weights) for the respective entries of the lookup table. For example, the following table shows count values for the four options described above:

TABLE 2

Example Lookup Table

| Count Value | Entry |
|---|---|
| 40 | <value a1, value a2, . . .> |
| 30 | <value b1, value b2, . . .> |
| 20 | <value c1, value c2, . . .> |
| 10 | <value d1, value d2, . . .> |

The sum total of the count values (weights) indicates the range of the options. The backend system can use a random number, generated between 1 and the sum total of the count values, to select one of the entries in the lookup table by comparing the random number to successive running totals. In the example shown in Table 2, if the random number is 40 or less, the first entry is selected. Otherwise, if the random number is between 41 and 70, the second entry is selected. Otherwise, if the random number is between 71 and 90, the third entry is selected. Otherwise, the last entry is selected. The threshold values for a lookup table can be fixed and predetermined. Or, the threshold values for a lookup table can vary dynamically (e.g., depending on bet level). Or, a lookup table can be dynamically selected (e.g., depending on bet level, depending on another factor) from among multiple available lookup tables. Different parameters or choices during game play can use different lookup tables. Or, different combinations of parameters or choices can be combined in entries of a given lookup table.

After the discarded cards are replaced 408 in the base hand of cards and, if the method 400 provides a multi-hand poker game, the one or more additional hands of cards are completed 412, the method 400 continues with determining 414 the winning card combinations, if any, included in the completed base hand of cards and, optionally, the completed one or more additional hands of cards. Determining 414 the winning card combinations may include comparing the card combinations included in each completed hand of cards to determine a hand rank of the final hand and an associated payout award. Any hand rank of the completed hands of cards associated with a payout greater than zero may be determined 414 to be a winning card combination. Table 3 shows an example payout table associating various hands with payout awards, where the payout awards for each hand rank vary based on the amount of the wager received 402 from the player:

TABLE 3

Example Paytable for a Five Card Draw Poker Game

| Hand | Payout (per wager amount) 1CR | 2CR | 3CR | 4CR | 5CR |
|---|---|---|---|---|---|
| Royal Straight Flush | 250 | 500 | 750 | 1000 | 4000 |
| Straight Flush | 50 | 100 | 150 | 200 | 250 |
| Four Aces + 2, 3, or 4 | 400 | 800 | 1200 | 1600 | 2000 |
| Four 2s, 3s, or 4s, + A, 2, 3, or 4 | 160 | 320 | 480 | 640 | 800 |
| Four Aces | 160 | 320 | 480 | 640 | 800 |
| Four 2s, 3s, or 4s | 80 | 160 | 240 | 320 | 400 |
| Four 5s thru Ks | 50 | 100 | 150 | 200 | 250 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| One Pair (Js thru As) | 1 | 2 | 3 | 4 | 5 |
| Anything else | 0 | 0 | 0 | 0 | 0 |

If it is determined 414 that the completed hands of cards include one or more winning card combinations, the method 400 continues with awarding 416 a payout to the player based on the total payout associated with the one or more winning card combinations (e.g., determined based on the paytable shown in Table 3). The payout may be awarded 416 in the form of increasing the player's credit balance by the payout value, or in form of real coins or a ticket redeemable for cash (e.g., at a kiosk). If none of the completed hands of cards includes a winning card combination as determined, the method 400 may end and no payout is awarded to the player.

Figure 5:
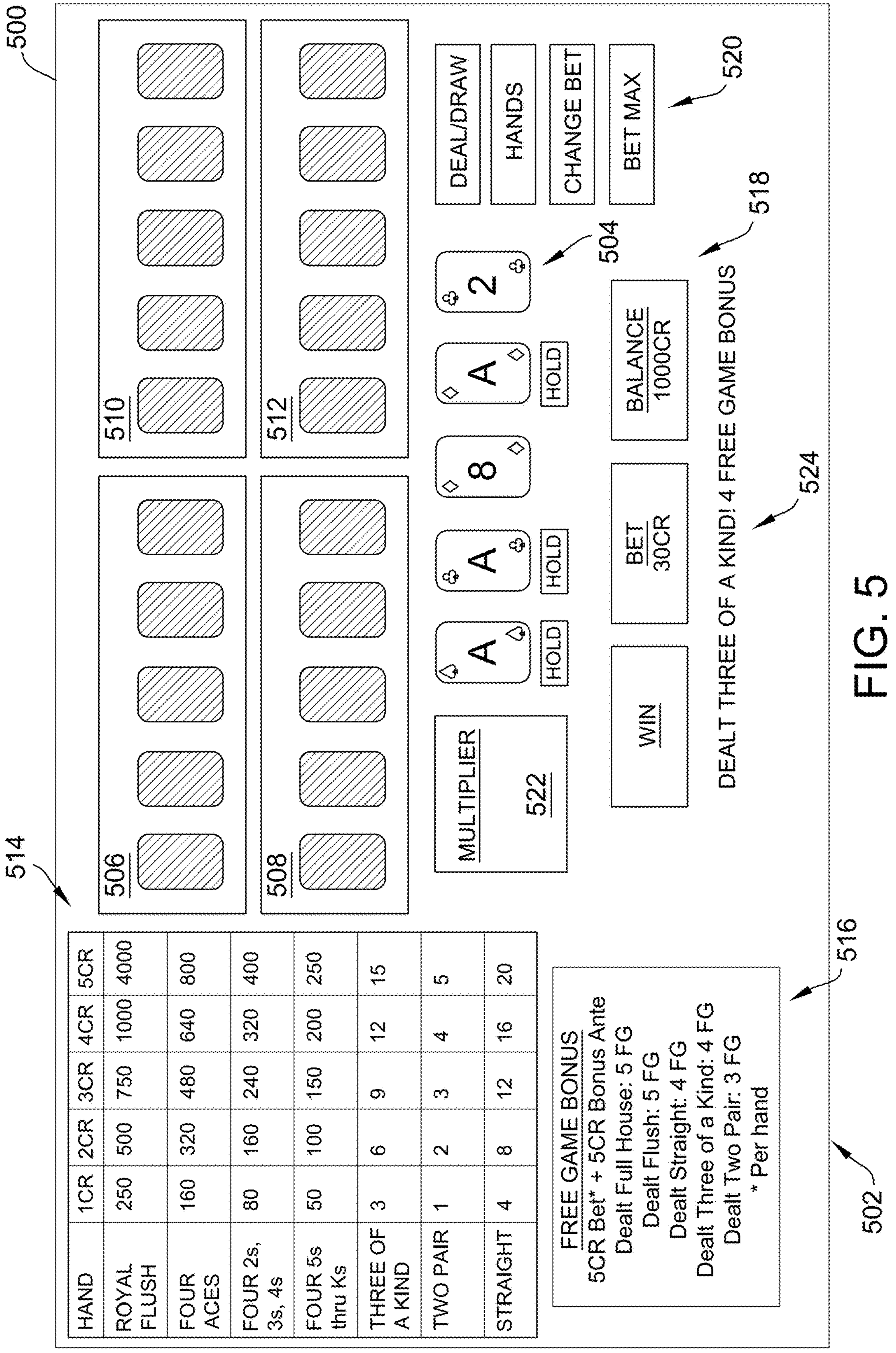
FIGS. 5 and 6 are diagrams that represent example screen shots of a display screen of an electronic gaming device on which a base electronic card game is displayed.
Figure 6:
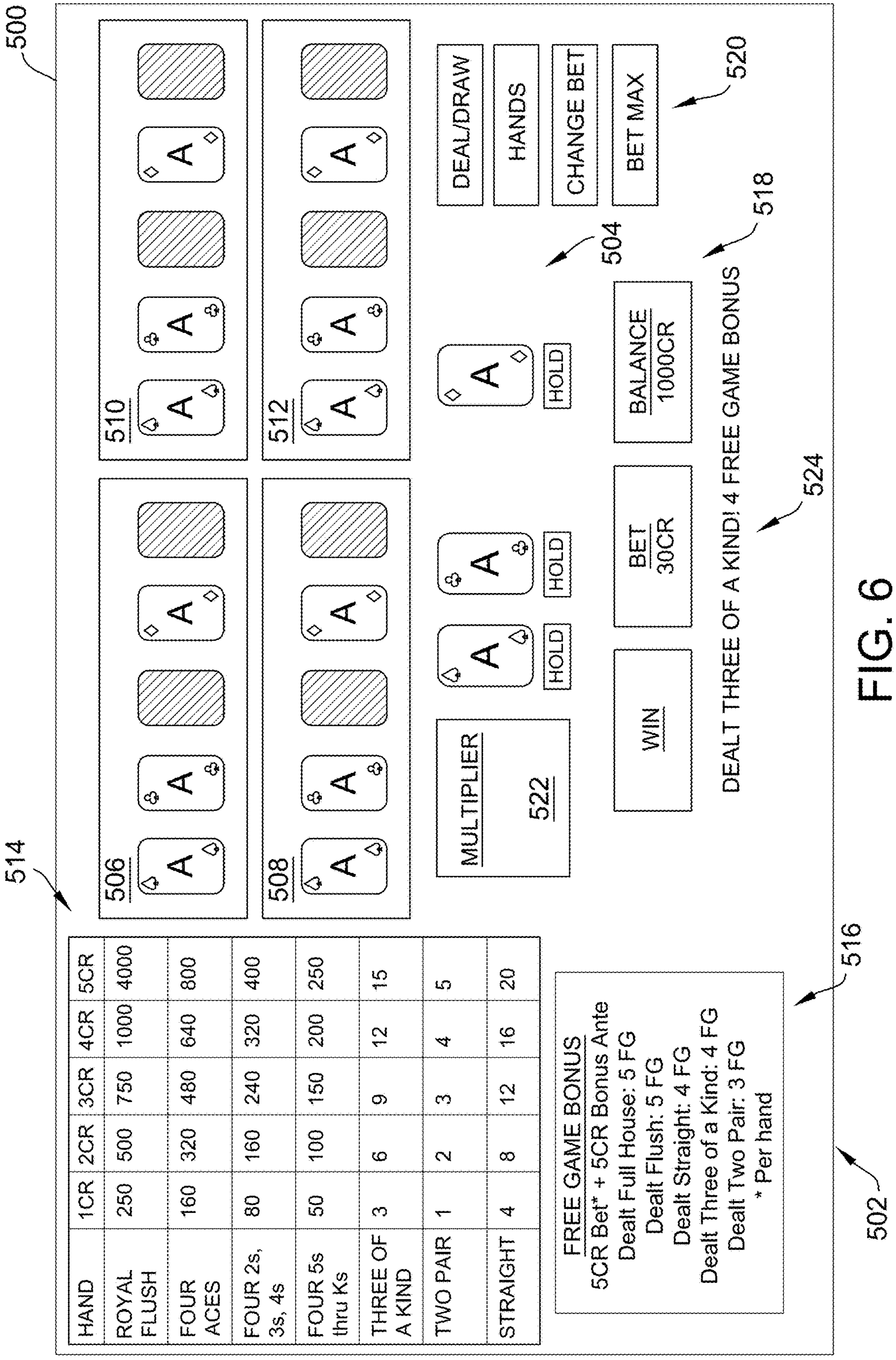
Figure 7:
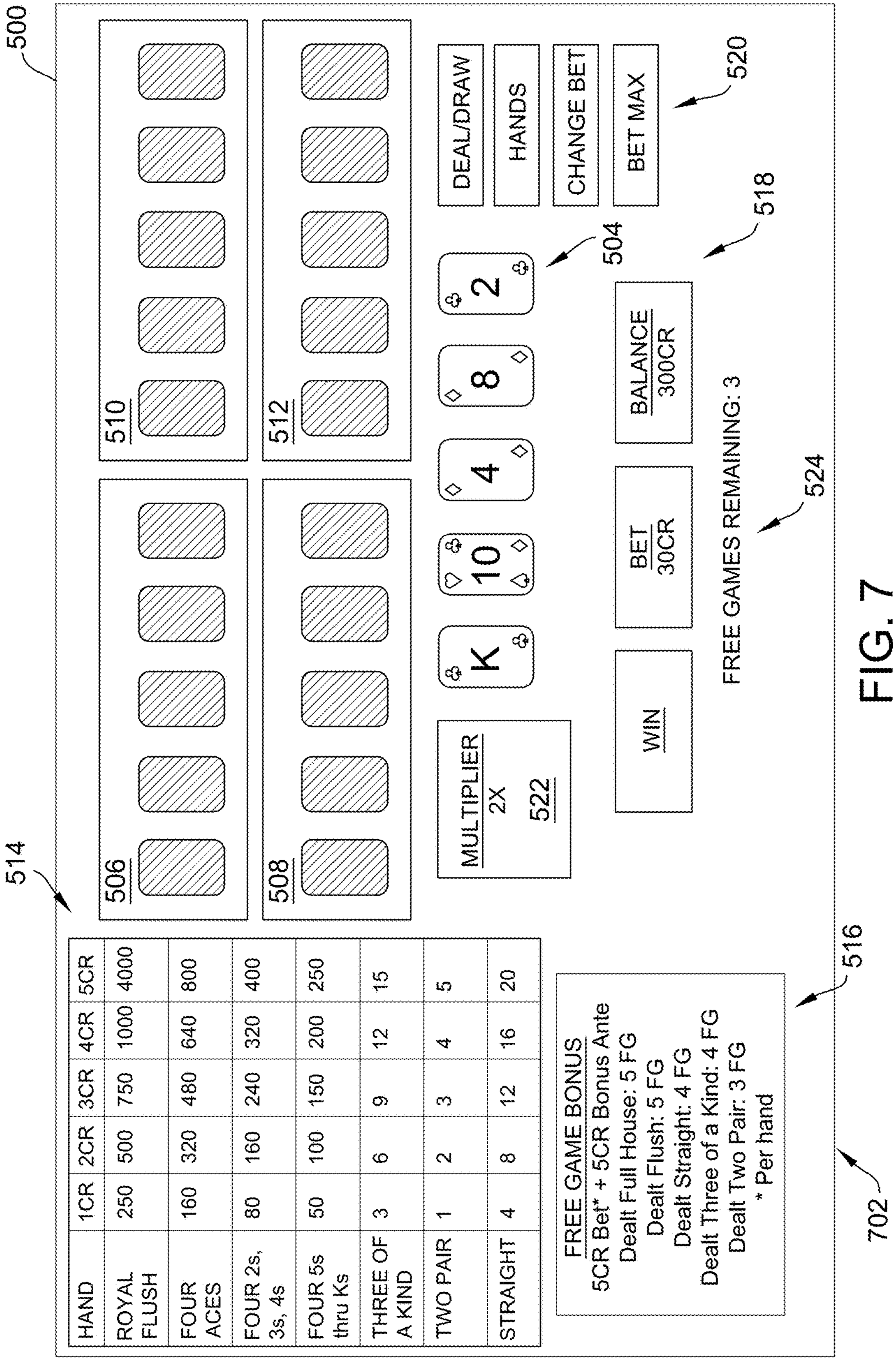
FIGS. 7-10 are diagrams that represent example screen shots of a display screen on which multiple free games of a free games feature triggered during the base electronic card game illustrated in FIGS. 5 and 6 are displayed.
Figure 8:
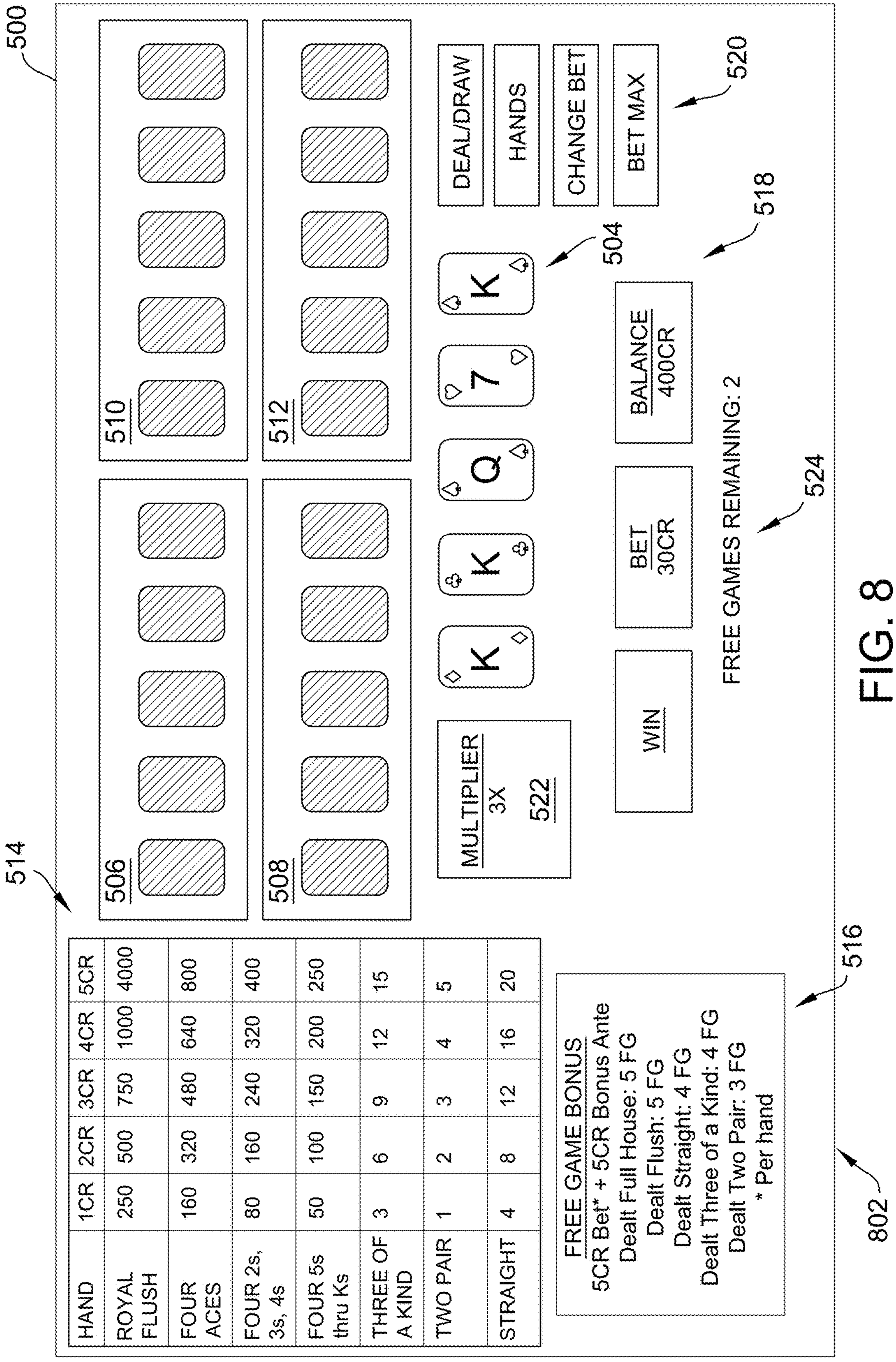
Figure 9:
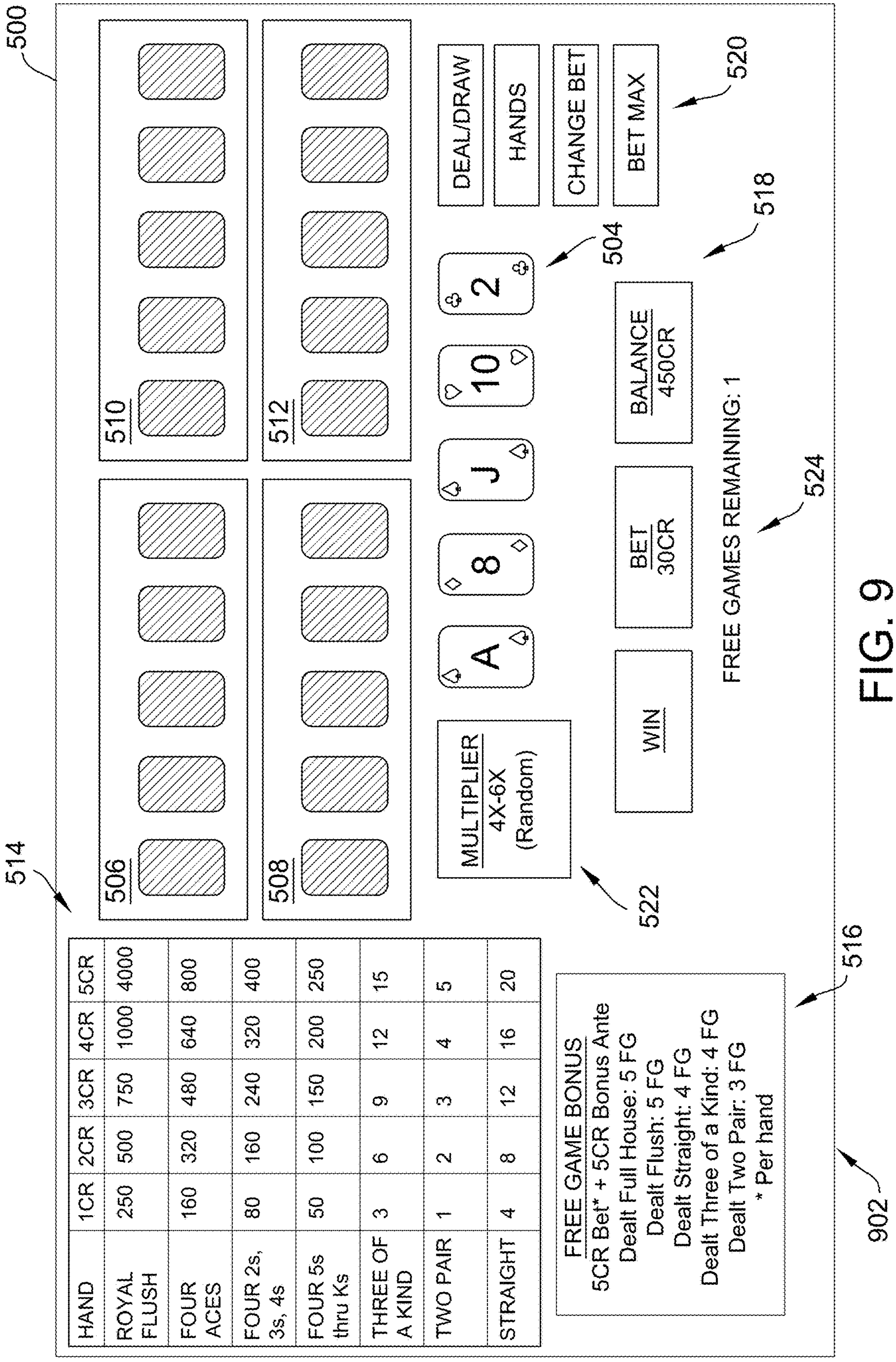
Figure 10:
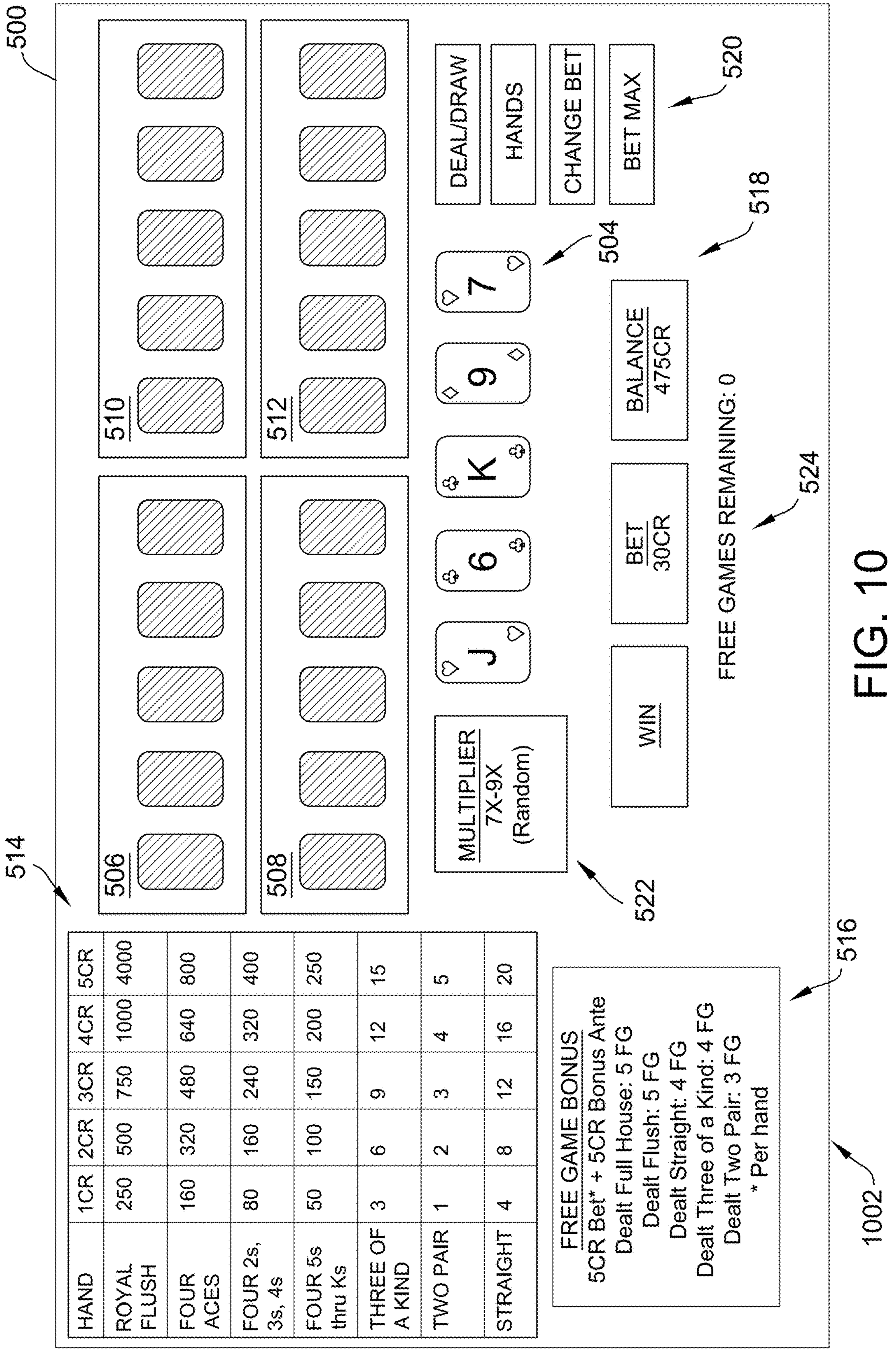

Referring now to FIGS. 5-10, an example electronic card game that includes a free games feature with increasing multipliers will now be described. FIGS. 5 and 6 are diagrams that represent example screen shots of a display screen 500 of an electronic gaming device (e.g., gaming device 104A-X in FIG. 1 or gaming device 200 in FIG. 2) on which a base electronic card game 502 is displayed. The base electronic card game 502 may be provided and played according to the method 400 illustrated in FIG. 4 and described above. FIGS. 7-10 are diagrams that represent example screen shots of the display screen 500 on which multiple free games 702, 802, 902, and 1002 of a free games feature triggered by at least one condition being satisfied during the base game 502 are displayed. The screen shots may be rendered on a main display screen, secondary display screen, or other display screen of an electronic gaming device. The screen shots may additionally or alternatively be rendered on a display screen of a mobile device (e.g., mobile gaming devices 256 in FIG. 2).

In the example implementations of the electronic card game described herein with reference to FIGS. 5-10, the base game 502 and the free games 702, 802, 902, 1002 are each Five Card Draw video poker games. In various alternative implementations, gaming systems may implement the improvements described herein in other electronic card games and are not limited to Five Card Draw video poker games. For example, the improvements described herein may be implemented in other video poker type games, such as Three Card Poker, Five Card Stud, Seven Card Stud, Texas Hold 'Em, Omaha Hold 'Em, and Pai-Gow Poker. Further, although the example implementations involve a free games feature in which free games of the same type of video poker game is played (i.e., Five Card Draw video poker), in other embodiments, another video poker type game or other electronic card game may be played during the free games feature that is different from the base game.

During play of a base game (e.g., the base game 502) displayed on the electronic gaming device, a free games feature may be triggered based on at least one condition being satisfied. In response to the free games feature being triggered, a set of free games (e.g., the free games 702, 802, 902, 1002) are successively generated and played after the base game has been played. In example implementations, the at least one condition may include a first condition and a second condition that each need to be satisfied to trigger the free games feature. In example implementations, the first condition may be a pre-defined winning card combination displayed during the base game. For example, the first condition may be a pre-defined winning card combination displayed in a base hand of cards (e.g., a base hand of cards 504 displayed during the base game 502) before a player selects one or more cards from the base hand of cards to hold or discard, as described further below. The second condition may be a pre-defined wager amount received from a player before the base game is generated. For example, the second condition may be a pre-defined ante bet received from the player in addition to a wager received from the player to initiate the base game. In other implementations, only one of the first condition and the second condition may need to be satisfied to trigger the free games feature. Further, the first condition and/or the second condition may include different triggering conditions than those described herein. For example, another winning card combination different than those described herein may be a pre-defined winning card combination that satisfies the first condition. Moreover, a pre-defined winning card combination that is displayed in a hand of cards other than the base hand of cards (e.g., one or more additional hands of cards 506, 508, 510, 512 displayed during the base game 502) may satisfy the first condition.

The free games feature that is triggered by satisfying the at least one condition includes at least a first free game generated after play of the base game and a second free game generated after play of the first free game. In other words, the first free game and the second free game of the free games feature are played successively after play of the base game. During the first free game, a first multiplier is applied to a payout award associated with any winning card combinations resulting from play of the first free game. During the second free game, a second multiplier is applied to a payout award associated with any winning card combinations resulting from play of the second free game. The second multiplier is greater than the first multiplier such that, as the successive free games are played during the free games feature, the multiplier applied during the free games increases with each successive free game. In some implementations, the second multiplier may be greater than or equal to the first multiplier such that the multiplier applied during the free games does not decrease with each successive free game. The free games feature may include any suitable number of free games in addition to and played after the first free game and the second free game. The additional free games that may be played during the free games feature suitably include a multiplier applied during the additional free games that is greater than or equal to a multiplier applied during a preceding free game. For example, in some implementations, the free games feature may include a third free game played after the second free game, where a third multiplier is applied to a payout award associated with any winning card combinations resulting from play of the third free game, and where the third multiplier is greater than or equal to the first and second multipliers. The free games feature may additionally and/or alternatively include a fourth free game played after the third free game during which a fourth multiplier greater than or equal to the third multiplier is applied to any payout award associated with the fourth free game, a fifth free game played after the fourth free game during which a fifth multiplier greater than or equal to the fourth multiplier is applied to any payout award associated with the fifth free game, and so on.

In example implementations where the first condition is satisfied by a pre-defined winning card combination displayed during the base game, more than one winning card combination may satisfy the first condition. For example, pre-defined winning card combinations may include, without limitation, a two pair (e.g., a pair of Jacks and a pair of Twos), a three of a kind (e.g., three Fours or three Eights), a straight (e.g., straight Ace through Four), a flush (e.g., all Hearts or all Spades), and/or a full house (e.g., three Fives and two Kings). The free games played during the free games feature may vary depending on the winning card combination that is displayed during the base game to satisfy the first condition. For example, the pre-defined winning card combinations may be associated with different sets of free games that are generated during the free games feature. The different sets of free games may include a different number of free games. For example: a two pair may be associated with a first set of free games that includes the first free game, the second free game, and the third free game: a three of a kind and a straight may be associated with a second set of free games that includes the first free game, the second free game, the third free game, and the fourth free game; and a flush and a full house may be associated with a third set of free games that includes the first free game, the second free game, the third free game, the fourth free game, and a fifth free game. The different sets of free games may additionally and/or alternatively include different multipliers applied during one or more free games of the set. For example, in some implementations, each of the pre-defined winning card combinations may be associated with a set of free games that includes the first free game, the second free game, and the third free game, but the multipliers applied during the first free game, the second free game, and/or the third free game may differ based on the pre-defined winning card combination, with the proviso that the multipliers applied for each free game of the set successively increase with successive plays of the first, second, and third free games. Moreover, in some example implementations, the multiplier applied during one or more free games of the free games feature may be randomly determined, with the proviso that the randomly determined multiplier is greater than or equal to a multiplier applied for each preceding free game. For example, where a pre-defined winning card combination is associated with a set of free games that includes the first free game, the second free game, and the third free game, the first and second multipliers may be fixed (e.g., the first multiplier may be 1× or 2× and the second multiplier may be 2× or 3×), and the third multiplier may be randomly selected from a group of multipliers that includes a 4× multiplier, a 5× multiplier, and a 6× multiplier.

FIG. 5 illustrates an initial display of the base hand of cards 504 on the display screen 500 during a play of the base game 502. The initial display of the base hand of cards 504 may also be referred to herein as an initial outcome, initial deal, or initial draw of the base hand of cards 504. The initial deal of the base hand of cards 504 is displayed when a play of the base game 502 is generated in response to receiving a wager from a player as described in detail herein. Moreover, as illustrated in FIG. 5, each card of the base hand of cards 504 is displayed face-up during the initial deal of the base Five Card Draw poker game 502. In other implementations in which the base game 502 is another type of video poker game, one or more of the base hand of cards 504 may be displayed face-down during the initial deal, depending on the rules of the particular video poker game.

The example base game 502 is a multi-hand type Five Card Draw video poker game in which a first additional hand of cards 506, a second additional hand of cards 508, a third additional hand of cards 510, and a fourth additional hand of cards 512 are displayed on the display screen 500. As illustrated in FIG. 5, during display of the initial deal of the base hand of cards 504, each of the additional hands of cards 506-512 are face-down. As described in detail herein, the additional hands of cards 506-512 are initially populated (shown in FIG. 6) after the gaming device receives a player selection of cards from the initial deal of the base hand of cards 504 to hold or discard and the additional hands of cards 506-512 are subsequently completed.

The display screen 500 also includes a paytable area 514, a free game table area 516, a credit area 518, an input area 520, and a multiplier area 522. The credit area 518 displays the credit balance of the player, the amount wagered (i.e., the current bet) by the player during a play of the base game 502, and a total payout awarded or won based on an outcome of the base game 502 or one of the free games 702, 802, 902, 1002. The input area 520 displays several user-selectable buttons on the display screen 500 (which is a touch screen in the example implementation). In particular, the input area 520 includes a DEAL|DRAW button that enables the player to submit their wager and initiate the base game 502 and/or to complete the base hand of cards 504 and the additional hands of cards 506-512 after selecting the cards to hold and discard from the initial deal of the base hand of cards 504 (e.g., during the base game 502 and/or one of the free games 702, 802, 902, 1002), a HANDS button that allows the player to selectively adjust a number of additional hands displayed during a play of the base game 502 and/or the free games 702, 802, 902, 1002, a CHANGE BET button that allows the player to selectively adjust an amount wagered to initiate the base game 502, and a BET MAX button that enables the player to bet the wager amount needed to make the player eligible to trigger a free games feature (i.e., to satisfy the second condition) as described herein. In some implementations, the input area 520 may not be displayed on the displayed screen 500 and the user-selectable buttons may instead be located elsewhere (e.g., may be player-input buttons located elsewhere on the gaming device).

The paytable area 514 displays information related to payout awards associated with various hands that may be displayed in the completed base hand of cards 504 and/or the completed additional hands of cards 506-512, during the base game 502 and/or during any of the free games 702, 802, 902, 1002. The paytable area 514 also displays the variations in payout awards for each hand based on the amount wagered by the player to initiate a play of the base game 502. In the illustrated example, the information displayed in the paytable area 514 is similar to Table 3 described elsewhere herein. The payout award information illustrated on the display screen 500 and described in Table 3 is provided for example only and is not limiting whatsoever on the present disclosure.

The free game table area 516 displays information related to a potential free games feature that may be triggered during the base game 502. In the example base game 502, the free games feature is triggered by satisfying a first condition and a second condition. In other implementations, only one of the first condition and the second condition may need to be satisfied to trigger the free games feature. The first condition is a pre-defined winning card combination displayed during the initial deal of the base hand of cards 504 and the second condition is a pre-defined wager amount received from a player before the base game 502 is initiated and the initial deal of the base hand of cards 504 is displayed. The free game table area 516 displays the wager amount that satisfies the second condition. As shown in the illustrated example, the free game table area 516 displays that a wager amount of 5 credits per hand (e.g., 25 credits in this example implementation for the base hand of cards 504 and the four additional hands of cards 506-512) plus a 5 credit ante bet is needed to satisfy the second condition, totaling to 30 credits in the example five-card hand base game 502. The wager amount to satisfy the second condition is provided for example only, and may vary between implementations of the base game 502. For example, in some implementations, an additional ante bet may not be required to satisfy the second condition (e.g., a player may need only bet the max credits for each hand to satisfy the second condition), or, in some other implementations, an additional ante bet may be required for each hand in addition to the max credit bet for each hand.

The free game table area 516 also displays the pre-defined winning card combinations that satisfy the first condition. In the example implementation, the first condition is satisfied by one of multiple pre-defined winning card combinations being displayed in the initial deal of the base hand of cards 504. As shown in the illustrated example, the pre-defined winning card combinations that satisfy the first condition, as displayed in the free game table area 516, include a two pair, a three of a kind, a straight, a flush, and a full house. Moreover, in the example implementation, a number of the free games played during the free games feature varies depending on the winning card combination displayed in the initial deal of the base hand of cards 504. As shown in the illustrated example, the free game table area 516 displays the number of free games associated with each pre-defined winning card combination: a two pair triggers three free games, a three of a kind or a straight triggers four free games, and a flush or a full house triggers five free games. As described in more detail herein, different award multipliers may be applied during the free games associated with each pre-defined winning card combination. Although not specifically shown in the illustrated example, the free game table area 516 may additionally and/or alternatively display the multipliers applied during the free games for each pre-defined winning card combination. During each free game played during a triggered free games feature, the applied award multiplier is displayed in the multiplier area 522.

As illustrated in the example shown in FIG. 5, in the initial deal of the base hand of cards 504, three Aces, an Eight, and a Two are displayed. The player is enabled (e.g., by touching the desired hold cards on the display screen 500 or using player-input buttons provided at the gaming device) to select any of the five cards in the initial deal of the base hand of cards 504 to hold. The cards not selected by the player are the cards that will be discarded from the initial deal of the base hand of cards 504. In some examples, the player may select the cards to be discarded and the cards not selected are the cards that will be held in the base hand of cards 504. After the cards to be held or discarded are selected, the player may de-select any of the cards (e.g., by touching the card again on the display screen 500 or using player-input buttons provided at the gaming device) in case the player changes their mind about a particular card or mistakenly designated a card to be held or discarded. The display screen 500 may display indicia on or adjacent the selected cards to indicate to the player which cards have been selected to be held or discarded. In the illustrated example, the term HOLD is displayed adjacent to the held cards in the base hand of cards, as shown in FIGS. 5 and 6. The cards that do not include the term HOLD adjacent thereto are the cards that will be discarded. In the example illustrated in FIGS. 5 and 6, the player has selected to hold the Aces and discard the Eight and the Two from the base hand of cards 504.

When the player is satisfied with the cards selected to be held or discarded from the initial deal, the player may select to continue play of the base game 502 by selecting the DEAL|DRAW button. In response to receiving the player selection of held and discarded cards, the discarded cards are removed from the base hand of cards 504 and the additional hands of cards 506-512 are initially populated with the held cards. As shown in FIG. 6, the discarded Eight and Two have been removed from the base hand of cards 504 and each of the held Aces have been populated into each of the additional hands of cards 506-512.

Play of the base game 502 continues with completing the base hand of cards 504 and the additional hands of cards 506-512 by randomly selecting cards from respective virtual decks of cards. As described herein, the virtual decks of cards may independently be a standard 52-card deck or other types of card decks may be used (e.g., decks that include the standard 52 cards and one or more wild cards). In alternative implementations, the base hand of cards 504 and the additional hands of cards 506-512 may be randomly selected from the same virtual deck of cards. The base hand of cards 504 and the additional hands of cards 506-512 are completed by randomly selecting an equal number of cards from each respective virtual deck as the number of cards that were discarded from the initial base hand of cards 504. Thus, in the example implementation, two cards are randomly selected from each respective virtual card deck to complete the base hand of cards 504 and the additional hands of cards 506-512. Prior to the cards being randomly selected to complete the hands of cards 504-512, the held and discarded cards may be removed from each virtual deck of cards. As such, the two cards to complete each hand of cards 504-512 are randomly selected from respective virtual card decks that include 47 cards, i.e., each 52-card deck is less the three Aces, the Eight, and the Two. In some implementations, one, more than one, or all the virtual decks of cards may include the discarded cards from the base hand of hands 504 when randomly selecting cards to respectively complete the hands of cards 504-512. For example, in some implementations, the virtual decks of cards from which cards are randomly selected to complete the additional hands of cards 506-512 may include the discarded cards and be less the held cards. That is, in the illustrated example, the virtual decks of cards for the additional hands of cards 506-512 may be include the Eight and the Two, and be less the three Aces, such that the random selection to respectively complete the additional hands of cards 506-512 is drawing from 49-card decks.

As described herein, random selection of cards to complete the hands of cards 504-512 may be performed by generating a random number and performing a lookup operation for the random number in a lookup table to map the random number to an outcome or a decision that determines a selected card. The same lookup table may be used for each virtual deck in this example implementation. However, separate lookup tables may be utilized. The lookup table(s) is suitably weighted to control randomness and volatility by controlling the selection of cards for each hand of cards 504-512 that result in certain payout awards in the completed hand (i.e., controlling the overall "hit rate" of the outcome of the base game 502). Moreover, separate lookup tables may be implemented based on the wager amount received from a player to initiate the base game 502. For example, separate lookup tables that are differently weighted may be implemented to selectively adjust the overall hit rate of the outcome of the base game 502 based on the received wager amount. In this way, payout volatility and RTP may be controlled.

After the hands of cards 504-512 are completed, a total payout award is determined based on the hands in the completed hands of cards 504-512 (also referred to herein as the outcome of the base game 502). The payout award is determined by comparing the completed hands to a paytable (e.g., the paytable displayed in the paytable area 514 and/or the paytable described in Table 3 herein). In the example implementation, the payout awards associated with the hands are the same across the base hand of cards 504 and the additional hands of cards 506-512. In alternative implementations, the payout awards may differ between the hands of cards 504-512. For example, a different paytable may be used to determine a payout associated with the base hand of cards 504 and the a payout associated with each of the additional hands of cards 506-512. Once the payout award associated with the outcome of the base game 502 is determined, the payout award may be displayed and the credit balance in the credit area 518 is increased by the payout award, if any.

Once the payout award, if any, of the outcome of the base game 502 is determined and disbursed to the player, the free games feature, if triggered, is initiated. As described herein, the free games feature is triggered by satisfying the first condition and the second condition. The first condition in this example implementation is satisfied by a pre-defined winning card combination being displayed in the initial deal of the base hand of cards 504. The second condition in this example implementation is satisfied by receiving a pre-defined wager amount from the player upon initiating the base game 502 (i.e., receiving the pre-defined wager amount prior to the initial deal of the base hand of cards 504). As shown in FIGS. 5 and 6, the first condition is satisfied in the illustrated example because a three of a kind is displayed in the initial deal of the base hand of cards 504. The second condition is satisfied because the pre-defined wager amount (i.e., the max bet of 5 credits for each hand of cards 504-512 plus the addition 5 credit ante bet) is received from the player when the base game 502 is initiated. Thus, the free games feature is triggered and is initiated after the outcome of the base game 502 is displayed.

The display screen 500 may include a notification or metamorphic area 524 that indicates to the player that a free games feature is triggered. During play of the base game 502, the area 524 displays text that indicates if the initial deal of the base hand of cards 504 includes a pre-defined winning card combination to satisfy the first condition. The area 524 also displays the number of free games associated with the pre-defined winning card combination. As described above, in the example implementation, a three of a kind in the initial deal of the base hand of cards 504 is associated with four free games. The other pre-defined winning card combinations may be associated with different numbers of free games: a two pair triggers three free games, a straight triggers four free games, and a flush or a full house triggers five free games. The text may be displayed in the area 524 during the play of the base game 502. For example, as shown in FIG. 5, the text may be displayed in the area 524 after and/or concurrent with the initial deal of the base hand of cards 504. Thus, the player may be alerted to the free games feature that will be initiated after play of the base game 502, which may facilitate increasing player excitement and engagement during gameplay. Moreover, although the area 524 displays text in the illustrated example, one or more metamorphics may be included in the area 524 and/or elsewhere on the display screen 500 that indicate to the player that a free games feature is triggered.

With reference now to FIGS. 7-10, the free games feature includes at least a first free game 702 (FIG. 7) generated after play of the base game 502 and a second free game 802 (FIG. 8) generated after play of the first free game 702. In the illustrated example, based on the three of a kind winning card combination in the initial deal of the base hand of cards 504, the free games feature also includes a third free game 902 (FIG. 9) generated after play of the second free game 802 and a fourth free game 1002 (FIG. 10) generated after play of the third free game 902. In the example implementation, each of the free games 702, 802, 902, 1002 is a Five Card Draw poker game. In other examples, the free games 702, 802, 902, 1002 may be a different video poker game or other electronic card game. Moreover, the free games 702, 802, 902, 1002 may be a different type of video poker game or other electronic card game than the base game 502. Additionally and/or alternatively, each of the free games 702, 802, 902, 1002 may be different video poker games or other electronic card games.

In the example implementation, during each free game 702, 802, 902, 1002, a free deal of the base hand of cards 504 is displayed. The virtual deck from which the cards of the base hand 504 are randomly selected may be re-shuffled prior to each free deal (e.g., the virtual deck is replenished with the held, discarded, and replacement cards from the preceding play of the base game 502 and any preceding play of a free game). The free deal of each free game 702, 802, 902, 1002 may be automatically displayed (i.e., without receiving any input from the player between the outcome of a preceding play and the free deal), or the player may be prompted to initiate the free deal (e.g., using the DEAL|DRAW button). Suitably, the free deal of each free game 702, 802, 902, 1002 does not require an additional wager. However, in some implementations, a player may be able to submit an additional wager prior to a free deal. For example, in some implementations, a player may be able to submit an additional ante bet to make the player eligible to re-trigger a subsequent free games feature during play of a free game.

In the example implementation, the free deal of each free game 702, 802, 902, 1002 includes a face-up display of five randomly selected cards in the base hand of cards 504, similar to the initial deal of a play of the base game 502. Each free game 702, 802, 902, 1002 also includes the same number of additional hands 506-512 that were played during play of the base game 502. In some examples, the number of additional hands 506-512 may be different during play of one, multiple, or all of the free games 702, 802, 902, 1002, than during play of the base game 502. In some examples, play of one, multiple, or all of the free games 702, 802, 902, 1002 may include play of a free deal of the base hand of cards 504 and without play of the additional hands of cards 506-512. In the example implementation, during the free deal of each free game 702, 802, 902, 1002, the additional hands of cards 506-512 are displayed face-down.

Similar to play of the base game, during free game play, the player is enabled to select any of the five cards in the respective free deal of the base hand of cards 504 to hold or discard. Subsequently, the player may select to continue play of the respective free game 702, 802, 902, 1002 by selecting the DEAL|DRAW button. In response to receiving the player selection of held and discarded cards, the discarded cards are removed from the respective free deal of the base hand of cards 504, and the additional hands of cards 506-512, if any, are initially populated with the held cards during the respective free game 702, 802, 902, 1002. Play of the respective free game 702, 802, 902, 1002 continues with completing the base hand of cards 504 and the additional hands of cards 506-512 by randomly selecting cards from respective virtual decks of cards, as described above with respect to play of the base game 502. After the hands of cards 504-512 are completed in each free game 702, 802, 902, 1002, a total free game payout award is determined based on the hands in the completed hands of cards 504-512 (also referred to herein as the outcome of the respective free game 702, 802, 902, 1002). The free game payout award is determined by comparing the completed hands to a paytable, which may be the same paytable as used in the base game 502 may be a different paytable. In some implementations, a different paytable may be used for each free game 702, 802, 902, 1002. Once the free game payout award associated with the outcome of the respective game 702, 802, 902, 1002 is determined, the free game payout award may be displayed and the credit balance in the credit area 518 is increased by the free game payout award, if any. Subsequently, the next free game is played and the process repeats until all the free games 702, 802, 902, 1002 have been played and the respective free game payouts have been awarded. In the example implementation, the free games feature ends after each of the free games have been played and the free game payouts have been awarded. A player must submit another wager to initiate another play of the base game 502, and no free games feature may be re-triggered during free game play. However, in other example implementations, a free games feature may be re-triggered during play of one or more of the free games. For example, in some implementations, a player may be enabled to submit an additional ante bet prior to initiating one of the free games to make the player eligible to re-trigger the free games feature (e.g., by satisfying the first condition during an initial deal of a free game).

In the example implementation, during each free game 702, 802, 902, 1002, a multiplier is applied to the free game payout award. More specifically, a first multiplier is applied to the payout award of the first free game 702, a second multiplier is applied to the payout award of the second free game 802, a third multiplier is applied to the payout award of the third free game 902, and a fourth multiplier is applied to the payout award of the fourth free game 1002. The multipliers increase for each successive free game 702, 802, 902, 1002. Thus, the second multiplier is greater than the first multiplier, the third multiplier is greater than the second multiplier, and the fourth multiplier is greater than the third multiplier. In the illustrated example, the first multiplier is a 2× multiplier, the second multiplier is a 3× multiplier, the third multiplier is either a 4×, 5×, or 6× multiplier, and the fourth multiplier is either a 7× multiplier, an 8× multiplier, or a 9× multiplier. The illustrated multipliers are provided for example only, and different multipliers may be applied to each of the free game payout awards, with the proviso that the second multiplier is greater than or equal to the first multiplier, the third multiplier is greater than or equal to the second multiplier, and the fourth multiplier is greater than or equal to the third multiplier. Moreover, the multipliers may vary based on the pre-defined winning card combination that satisfies the first condition. Table 4 below provides an example of the sets of free games respectively associated with the pre-defined winning combinations, where a number of free games and/or a multiplier applied during each free game varies between free game sets. The number of free games and/or the multipliers applied based on the winning card combinations are provided for example only. Moreover, the pre-defined winning card combinations that may satisfy the first condition may vary between implementations. The information provided in Table 4 below may be displayed in the free game table area 516 on the display screen 500, described above.

TABLE 4

Example Free Game Table for Winning Card Combinations

| Winning Card Combination | Number of Free Games (Multipliers Applied during each Free Game) |
|---|---|
| Full House | 5 FG (2X, 3X-4X, 5X-6X, 7X-9X, 10X-12X) |
| Flush | 5 FG (2X, 3X-4X, 5X-6X, 7X-9X, 10X-12X) |
| Three of a Kind | 4 FG (2X, 3X, 4X-6X, 7X-9X) |
| Straight | 4 FG (2X, 3X, 4X-6X, 7X-9X) |
| Two Pair | 3 FG (2X, 3X, 4X-5X) |

As shown in the sequence of FIGS. 7-10 and displayed in the multiplier area 522 on the display screen 500, during the first free game 702, and in accordance with Table 4, a first multiplier of 2× is applied to a first free game payout award. During the second free game 802, a second multiplier of 3× is applied to a second free game payout award. During the third free game 902, a third multiplier between 4× to 6× is applied to a third free game payout award. During the fourth free game 1002, a fourth multiplier between 7× to 9× is applied to a fourth free game payout award. As the free games 702, 802, 902, 1002 are played, the number of free games remaining may be displayed or otherwise indicated on the display screen 500 (e.g., in the notification or metamorphic area 524 as shown in FIGS. 7-10).

In the example implementation, the third multiplier applied during the third free game 902 and the fourth multiplier applied during the fourth free game 1002 are each randomly selected from a group of multipliers. In particular, the third multiplier is randomly selected from a group of multipliers that includes a 4× multiplier, a 5× multiplier, and a 6× multiplier. The fourth multiplier is randomly selected from a group of multipliers that includes a 7× multiplier, an 8× multiplier, and a 9× multiplier. Suitably, each of the group of multipliers from which the fourth multiplier is randomly selected are greater than or equal to each of the group of multipliers from which the third multiplier is randomly selected. Thereby, in each instance of randomly selecting the third and fourth multipliers, the fourth multiplier is greater than or equal to the third multiplier. In other implementations, multipliers applied during free games other than the third and fourth free games 902, 1002 may be randomly selected. For example, as described in Table 2 above, in instances where the initial deal of the base hand of cards 504 includes full house or a flush, a randomly selected second multiplier (between 3× to 4×) is applied to the second free game of the associated free game set and a randomly selected fifth multiplier (between 10× to 12×) is applied to the fifth free game of the associated free game set. In other implementations, any multiplier applied during any free games of a set of free games associated with a pre-defined winning card combination may be randomly selected, with the proviso that the randomly selected multiplier is greater than or equal to the multiplier applied during a preceding free game. Randomly selecting the multipliers applied during at least some of the free games of the free games features facilitates increasing variation in the free games feature, player engagement, and player excitement.

Random selection of the multipliers applied to one or more of the free games of the free games feature may be performed by generating a random number and performing a lookup operation for the random number in a lookup table to map the random number to an outcome or a decision that determines a selected card. Separate lookup tables may be utilized for each set of free games. For example, separate look up tables may be utilized to randomly select the third multipliers applied during a set of free games associated with an initially dealt full house and a set of free games associated with an initially dealt three of a kind. The lookup table(s) is suitably weighted to control randomness and volatility by controlling the selection of a multiplier that results in increased free game payout awards (i.e., controlling the overall "hit rate" of the outcome of a free game of the free games feature). In this way, payout volatility and RTP may be controlled.

Figure 11:
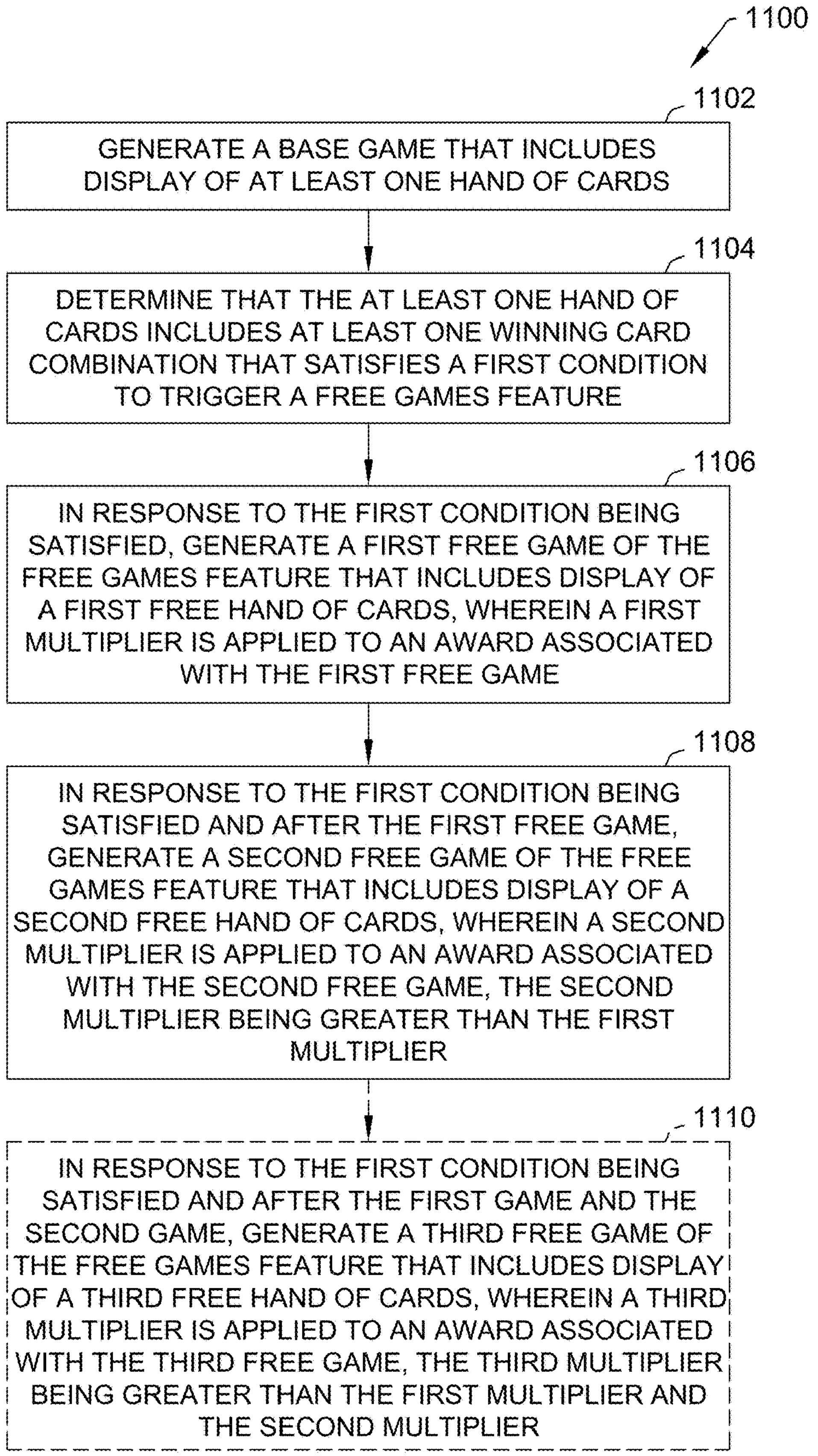
FIG. 11 illustrates an example computer-implemented method of providing an electronic card game with a free games feature in which multipliers are applied and successively increase with each successive free game.

With reference to FIG. 11, an example computer-implemented method 1100 of providing an electronic card game with a free games feature in which multipliers are applied to free games and the applied multipliers increase with each successive free game is illustrated. The example method 1100 may be implemented in a server (e.g., server 102) and/or a gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 can store one or more game programs 206 that provide program instructions and/or data for carrying out various implementations (e.g., game mechanics) that, when executed by the processor 204, cause the processor 204 to perform certain operations to perform the method 1100.

The method 1100 may be performed in conjunction with the example method 400 (shown in FIG. 4). More specifically, the method 1100 includes generating 1102 a base electronic card game (e.g., the base game 502 shown in FIGS. 5 and 6) that includes display of at least one hand of cards on the gaming device (e.g., on a primary game display 240 and/or a secondary game display 242 of the gaming device 200 shown in FIG. 2). The base game generated 1102 in the method 1100 may be the same or similar to the base game generated 404 in the method 400. The method 1100 may continue with providing the base game as described above with reference to FIG. 4 and steps 404-416 of the method 400.

The method 1100 also includes determining 1104 that the at least one hand of cards includes at least one winning card combination that satisfies a first condition to trigger a free games feature. As described in detail herein, the first condition to trigger the free games feature may be a pre-defined winning card combination included in an initial deal of a base hand of cards (e.g., an initial deal of the base hand of cards 504 as illustrated in FIG. 5). As described in detail herein, more than one pre-defined winning card combination may satisfy the first condition. For example, pre-defined winning card combinations may include, without limitation, a two pair, a three of a kind, a straight, a flush, and/or a full house.

In response to the first condition being satisfied, the method 1100 continues with initiating the free games feature. The free games feature includes a set of free games (e.g., free games 702, 802, 902, 1002 shown in FIGS. 7-10) that each include display of at least one free hand of cards, as described in detail herein. The free games feature in example implementations of the method 1100 described herein is initiated after play of the base game (e.g., after the steps 402-416 of the method 400 have been performed). In other implementations, the free games feature may be initiated in the method 1100 such that the base game is interrupted. When the free games feature is initiated in response to the first condition being satisfied, a set of free games including at least a first free game and a second free game are successively generated 1106, 1108 and played. Moreover, in some example implementations, the first condition and a second condition may each need to be satisfied to trigger the free games feature. As described in detail herein, the second condition may be a pre-defined wager amount received from a player before the base game is generated 1102. For example, the second condition may be a pre-defined ante bet received from the player in addition to a wager received from the player to initiate the base game.

In the method 1100, the first free game that is generated 1106 in response to the first condition and, optionally, the second condition being satisfied includes display a first free hand of cards, and a first multiplier is applied to a payout award associated with an outcome of the first free hand of cards. Similarly, the second free game that is generated 1108 in response to the first condition and, optionally, the second condition being satisfied, and after the first free game is generated 1106 and played, includes display of a second free hand of cards, and a second multiplier is applied to a payout award associated with an outcome of the second free hand of cards. The second multiplier is greater than the first multiplier such that, as the successive first and second free games are generated 1106, 1108 and played during the free games feature, the multiplier applied during the free games increases with each successive free game.

The free games feature may include any suitable number of free games in addition to and played after the first free game and the second free game are generated 1106, 1108 and played. The additional free games that may be played during the free games feature suitably include a multiplier applied during the additional free games that is greater than or equal to a multiplier applied during a preceding free game. For example, the method 1100 may also include generating 1110, in response to the first condition and, optionally, the second condition being satisfied, and after the first and second free games are generated 1108 and played, a third free game that includes display of a third free hand of cards, and a third multiplier is applied to a payout award associated with an outcome of the third free hand of cards, the third multiplier being greater than or equal to the first and the second multipliers.

In example implementations of the method 1100, as described in detail herein, the pre-defined winning card combinations that satisfy the first condition may be associated with different sets of free games that are generated during the free games feature. For example, the different sets of free games may include a different number of free games, and/or the different sets of free games may include different multipliers applied during one or more free games of the set. Moreover, in some example implementations, the multiplier applied during one or more free games of the free games feature may be randomly determined, with the proviso that the randomly determined multiplier is greater than or equal to a multiplier applied for each preceding free game. Thus, the method 1100 may also include determining a number of free games of the free games feature triggered in response to the first condition and, optionally, the second condition being satisfied, based on the pre-defined winning card combination determined 1104 to be included in the at least one hand of cards. Moreover, the method 1100 may additionally and/or alternatively include randomly selecting at least one of the first multiplier applied during the first free game, the second multiplier applied during the second free game, and/or the third multiplier applied during the optional third free game, with the proviso that the randomly determined multiplier is greater than or equal to a multiplier applied for each preceding free game.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

a memory storing one or more rules defining at least a first condition, the rules including (i) one or more predefined card combinations, (ii) a predefined number of free games associated with each of the one or more predefined card combinations, wherein the predefined number of free games associated with each of the one or more predefined card combinations depends on a probability of displaying the corresponding card combination of the one or more predefined card combinations, and (iii) for each free game of the predefined number of free games associated with each of the one or more predefined card combinations, a set of one or more possible multiplier values;

a display device; and a processor configured to execute instructions stored in the memory, which when executed, cause the processor to:

generate a base game outcome that includes display of at least one hand of cards on the display device;

in response to generating the base game outcome, compare the at least one hand of cards to the one or more predefined card combinations stored in the memory, to determine that a first condition is satisfied for triggering a free games feature;

in response to the first condition being satisfied, determine a number of free game outcomes to generate based on the at least one hand of cards, each of the free game outcomes associated with a corresponding multiplier specified by the set of one or more possible multiplier values;

after determining the number of free game outcomes to generate, generate a first free game outcome of the free games feature that includes display of a first free hand of cards, wherein a first multiplier is applied to an award associated with the first free game outcome; and in response to the first condition being satisfied and after the first free game outcome is generated, generate a second free game outcome of the free games feature that includes display of a second free hand of cards, wherein a second multiplier is applied to an award associated with the second free game outcome, the second multiplier being greater than the first multiplier.

2. The electronic gaming system of claim 1, wherein the instructions, when executed, further cause the processor to:

generate the base game outcome in response to a wager received from a player by the electronic gaming system;

determine that an amount of the wager satisfies a second condition to trigger the free games feature; and in response to both the first condition and the second condition being satisfied, generate the first free game outcome of the free games feature and, subsequently, the second free game outcome of the free games feature.

3. The electronic gaming system of claim 1, wherein the instructions, when executed, further cause the processor to, in response to the first condition being satisfied and after generating the first free game outcome and the second free game outcome, generate a third free game outcome of the free games feature that includes display of a third free hand of cards, wherein a third multiplier is applied to an award associated with the third free game outcome, the third multiplier being greater than the first multiplier and the second multiplier.

4. The electronic gaming system of claim 3, wherein the instructions, when executed, further cause the processor to randomly select the third multiplier from the set of one or more possible multiplier values associated with the third free game outcome, each multiplier of the set of one or more possible multiplier values associated with the third free game outcome being greater than the first multiplier and the second multiplier.

5. The electronic gaming system of claim 1, wherein the instructions, when executed, further cause the processor to randomly select the second multiplier from the set of one or more possible multiplier values associated with the second free game outcome, each multiplier of the one or more possible multiplier values associated with the second free game outcome being greater than the first multiplier.

6. The electronic gaming system of claim 1, wherein the base game outcome includes display of a base hand of cards randomly selected from a first deck of cards, and wherein the instructions, when executed, further cause the processor to:

determine at least one held card and at least one discarded card in the base hand of cards based on a player selection received by the electronic gaming system;

discard the at least one discarded card from the base hand of cards; and complete the base hand of cards after the at least one discarded card is discarded with an equal number of one or more cards randomly selected from the first deck of cards.

7. The electronic gaming system of claim 6, wherein the instructions, when executed, further cause the processor to:

cause display of the at least one held card in at least one additional hand of cards of the base game outcome; and complete the at least one additional hand of cards with one or more cards selected from at least one second deck of cards, wherein, for each of the at least one additional hand of cards, a number of the one or more cards selected from the at least one second deck of cards is equal to the number of the one or more cards selected from the first deck of cards to complete the base hand of cards after the at least one discarded card is discarded.

8. The electronic gaming system of claim 7, wherein the first free game outcome includes display of a number of first free hands of cards equal to a number of the base hand of cards and the at least one additional hand of cards of the base game outcome, wherein the first multiplier is applied to an award associated with any of the first free hands of cards.

9. The electronic gaming system of claim 8, wherein the second free game outcome includes display of a number of second free hands of cards equal to the number of the base hand of cards and the at least one additional hand of cards of the base game outcome, wherein the second multiplier is applied to an award associated with any of the second free hands of cards.

10. The electronic gaming system of claim 6, wherein the instructions, when executed, further cause the processor to determine that the base hand of cards includes the at least one winning card combination that satisfies the first condition to trigger the free games feature.

11. The electronic gaming system of claim 1, wherein the first condition is a predefined set of winning card combinations including at least a first winning card combination and a second winning card combination, the first winning card combination being associated with a first set of free games generated during the free games feature, the second winning card combination being associated with a second set of free games generated during the free games feature, each of the first set and the second set of free games including at least the first free game outcome and the second free game outcome, the second set of free games having a greater number of free games than the first set of free games.

12. The electronic gaming system of claim 11, wherein:

the first set of free games includes a third free game generated during the free games feature after the second free game outcome is generated, the third free game including display of a third free hand of cards, wherein a third multiplier is applied to an award associated with the third free game, the third multiplier being greater than the first multiplier and the second multiplier; and the second set of free games includes a fourth free game generated during the free games feature after the second free game outcome is generated, the fourth free game including display of a fourth free hand of cards, wherein a fourth multiplier is applied to an award associated with the fourth free game, and a fifth free game generated during the free games feature after the fourth free game, the fifth free game including display of a fifth free hand of cards, wherein a fifth multiplier is applied to an award associated with the fifth free game, the fourth multiplier being greater than the first and second multipliers and the fifth multiplier being greater than the first, second, third, and fourth multipliers.

13. The electronic gaming system of claim 12, wherein the third multiplier is randomly selected from the set of one or more possible multiplier values associated with the third free game that are each greater than the first and second multipliers, the fourth multiplier is randomly selected from the set of one or more possible multiplier values associated with the fourth free game that are each greater than the first and second multipliers, and the fifth multiplier is randomly selected from the set of one or more possible multiplier values associated with the fifth free game that are each greater than the first, second, third, and fourth multipliers.

14. A non-transitory computer-readable medium containing instructions embodied thereon, which when executed by a processor in communication with a memory storing one or more rules defining at least a first condition, the rules including (i) one or more predefined card combinations, (ii) a predefined number of free games associated with each of the one or more predefined card combinations, wherein the predefined number of free games associated with each of the one or more predefined card combinations depends on a probability of displaying the corresponding card combination of the one or more predefined card combinations, and (iii) for each free game of the predefined number of free games associated with each of the one or more predefined card combinations, a set of one or more possible multiplier values, cause the processor to:

generate, on a display device in communication with the processor, a base game outcome that includes display of at least one hand of cards;

in response to generating the base game outcome, compare the at least one hand of cards to the one or more predefined card combinations stored in the memory, to determine that a first condition is satisfied for triggering a free games feature;

in response to the first condition being satisfied, determine a number of free game outcomes to generate based on the at least one hand of cards, each of the free game outcomes associated with a corresponding multiplier specified by the set of one or more possible multiplier values;

after determining the number of free game outcomes to generate, generate a first free game outcome of the free games feature that includes display of a first free hand of cards, wherein a first multiplier is applied to an award associated with the first free game outcome; and in response to the first condition being satisfied and after the first free game outcome is generated, generate a second free game outcome of the free games feature that includes display of a second free hand of cards, wherein a second multiplier is applied to an award associated with the second free game outcome, the second multiplier being greater than the first multiplier.

15. The non-transitory computer-readable medium of claim 14, wherein the instructions, when executed, further cause the processor to, in response to the first condition being satisfied and after generating the first free game outcome and the second free game outcome, generate a third free game of the free games feature that includes display of a third free hand of cards, wherein a third multiplier is applied to an award associated with the third free game, the third multiplier being randomly selected from the set of one or more possible multiplier values associated with the third free game outcome, each multiplier of the set of one or more possible multiplier values associated with the third free game outcome being greater than the first multiplier and the second multiplier than the first multiplier and the second multiplier.

16. The non-transitory computer-readable medium of claim 14, wherein the base game outcome includes display of a base hand of cards randomly selected from a first deck of cards, and wherein the instructions, when executed, further cause the processor to:

determine at least one held card and at least one discarded card in the base hand of cards based on a player selection received by an input device in communication with the processor;

discard the at least one discarded card from the base hand of cards;

complete the base hand of cards after the at least one discarded card is discarded with an equal number of one or more cards randomly selected from the first deck of cards;

cause display of the at least one held card in at least one additional hand of cards of the base game outcome; and complete the at least one additional hand of cards with one or more cards selected from at least one second deck of cards, wherein, for each of the at least one additional hand of cards, a number of the one or more cards selected from the at least one second deck of cards is equal to the number of the one or more cards selected from the first deck of cards to complete the base hand of cards after the at least one discarded card is discarded.

17. A computer-implemented method of providing a game on an electronic gaming system, the computer-implemented method performed by a processor in communication with a memory storing one or more rules defining at least a first condition, the rules including (i) one or more predefined card combinations, and (ii) a predefined number of free games associated with each of the one or more predefined card combinations, wherein the predefined number of free games associated with each of the one or more predefined card combinations depends on a probability of displaying the corresponding card combination of the one or more predefined card combinations, and (iii) for each free game of the predefined number of free games associated with each of the one or more predefined card combinations, a set of one or more possible multiplier values, the computer-implemented method comprising:

generating a base game outcome that includes display of at least one hand of cards on a display device of the electronic gaming system;

in response to generating the base game outcome, comparing the at least one hand of cards to the one or more predefined card combinations stored in the memory, to determine that a first condition is satisfied for triggering a free games feature;

in response to the first condition being satisfied, determining a number of free game outcomes to generate based on the at least one hand of cards, each of the free game outcomes associated with a corresponding multiplier specified by the set of one or more possible multiplier values;

after determining the number of free game outcomes to generate, generating a first free game outcome of the free games feature that includes display of a first free hand of cards, wherein a first multiplier is applied to an award associated with the first free game outcome; and in response to the first condition being satisfied and after the first free game outcome is generated, generating a second free game outcome of the free games feature that includes display of a second free hand of cards, wherein a second multiplier is applied to an award associated with the second free game outcome, the second multiplier being greater than the first multiplier.

18. The computer-implemented method of claim 17, further comprising:

receiving, by the electronic gaming system, a wager from a player;

generating the base game outcome in response to the wager;

determining that an amount of the wager satisfies a second condition to trigger the free games feature; and in response to both the first condition and the second condition being satisfied, generating the first free game outcome of the free games feature and, subsequently, the second free game outcome of the free games feature.

* * * * *